United States Patent [19]
Li

[11] Patent Number: 5,464,189
[45] Date of Patent: Nov. 7, 1995

[54] VARIABLE OPENING SEAL

[75] Inventor: Lehmann K. Li, Wellesley, Mass.

[73] Assignee: Li Medical Technologies, Inc., Trumbull, Conn.

[21] Appl. No.: 230,804

[22] Filed: Apr. 21, 1994

Related U.S. Application Data

[63] Continuation of Ser. No. 959,263, Oct. 9, 1992, abandoned.

[51] Int. Cl.⁶ .................................................. F16K 7/08
[52] U.S. Cl. ..................................... 251/4; 137/614.14
[58] Field of Search .................. 251/4, 212; 137/614.14

[56] References Cited

U.S. PATENT DOCUMENTS 2,663,467  12/1953  Douglass et al. ................... 251/4 X
2,835,272   5/1958  Taupin ............................... 251/4 X
3,123,262   3/1964  Douglass ............................ 251/4 X
3,329,390   7/1967  Hulsey ................................. 251/4

Primary Examiner—John C. Fox
Attorney, Agent, or Firm—Pandiscio & Pandiscio

[57] ABSTRACT

A variable opening seal defining a passageway between a first environment and a second envoronment is provided. The seal includes an elastomeric member having a first end connected to the first environment, a second end connected to the second environment, and an internal passageway extending between its first and second ends. Selective rotation of the first end of the elastomeric member relative to the second end of the elastomeric member causes the elastomeric member to (a) wrap upon itself so as to selectively close the internal passageway, or (b) selectively unwrap an elastomeric member previously wrapped upon itself so as to selectively open the internal passageway.

6 Claims, 21 Drawing Sheets

VARIABLE OPENING SEAL

This is a continuation of U.S. application Ser. No. 07/959,263 filed Oct. 9, 1991 for "Variable Opening Seal" now abandoned.

FIELD OF THE INVENTION

This invention relates to seals in general, and more particularly to seals having a variable opening therein.

BACKGROUND OF THE INVENTION

In many situations, a passageway extending between two different environments must be closed off to prevent materials present in one environment from passing over to the other environment. At the same time, in many situations the passageway must be periodically opened up some or all of the way so as to permit materials to be passed from one environment to the other.

Furthermore, in some situations tools must be passed through the passageway—and hence through any seals already established across the passageway—so that their distal working ends are positioned in one environment while their proximal actuating ends are positioned in the other environment. Such a deployment is frequently very important, since it permits a person to perform tasks in one environment using the distal working end of the tool while manipulating the proximal actuating end of the tool in the other environment.

Unfortunately, however, it can be quite difficult to establish a secure seal about the periphery of a tool as it is inserted across the passageway and to thereafter reliably maintain that seal during the tool's use, particularly inasmuch as the tool may be moved about axially and/or radially during use, and particularly inasmuch as the tool may have a different cross-sectional profile along its length. Furthermore, in some circumstances it may be necessary to replace one deployed tool with another tool. In this case it can be quite difficult to reestablish a secure seal across the passageway when the initial tool is withdrawn, and it can be quite difficult to establish a secure seal with the replacement tool as it is emplaced. It should be appreciated that this can be particularly true in the case where the replacement tool has a cross-sectional profile which differs from that of the initial tool.

OBJECTS OF THE INVENTION

Accordingly, one object of the present invention is to provide a seal which is capable of completely sealing off a passageway extending between two different environments, so that materials present in one environment cannot pass over to the other environment.

Another object of the present invention is to provide a seal which has a variable opening therein, whereby when the seal is positioned in a passageway extending between two different environments, the seal may be opened up some or all of the way so as to permit materials to be passed from one environment to the other.

Yet another object of the present invention is to provide a seal which has a variable opening therein and means for regulating the size of that opening, whereby when the seal is positioned in a passageway extending between two different environments, the seal can act as a valve to regulate the amount of material passed from one environment to the other.

Still another object of the present invention is to provide a seal for closing off a passageway between two different environments which will permit a tool to be passed through the seal, so that the distal working end of the tool can be positioned in one environment while the proximal actuating end of the tool is positioned in the other environment, with the seal making a secure seal about the periphery of the tool as it extends through the seal.

And another object of the present invention is to provide a seal which will make a secure seal about the periphery of a tool extending therethrough even as the tool is moved about axially and/or radially relative to the seal.

And yet another object of the present invention is to provide a seal such that a tool extending therethrough may be withdrawn and the seal will thereafter completely close off the passageway so as to prevent materials from passing from one environment to the other.

And still another object of the present invention is to provide a seal such that a first tool extending through the seal may be withdrawn and a second tool inserted in its place, with the seal being capable of making a secure seal with both the first tool and the second tool, even where the two tools have different cross-sectional profiles.

Another object of the present invention is to provide a seal which is capable of sealing off a passageway extending between two different environments which will work with a variety of different materials, wherein the materials may be in a variety of different forms (e.g. gaseous and/or liquid) and/or at a variety of different pressures.

Yet another object of the present invention is to provide a seal which may be used with a wide variety of different devices of the sort used to establish a passageway between two different environments.

Still another object of the present invention is to provide a novel method for sealing a passageway extending between two different environments.

And another object of the present invention is to provide a seal which can make a secure seal about the periphery of a tool intended to be extended therethrough, even where the tool has a cross-sectional profile which varies along the length of the tool.

SUMMARY OF THE INVENTION

These and other objects of the present invention are addressed by a novel seal which comprises elastomeric means having a first end and a second end and defining an internal passageway therebetween, wherein the internal passageway connects a first environment with a second environment, and means for rotating the first and second ends of the elastomeric means relative to one another so as to progressively close down or open up the internal passageway.

More specifically, the novel seal comprises a first substantially rigid housing defining a first opening communicating with a first environment, a second substantially rigid housing defining a second opening and an elastomeric tube having a first end and a second end and defining an internal passageway therebetween. The first end of the elastomeric tube is attached to the first housing so that the tube's internal passageway is sealingly connected to the first opening, and the second end of the elastomeric tube is attached to the second housing. The first and second housings are axially rotatable relative to one another, whereby (1) the elastomeric tube can be wound on itself so as to progressively close down the tube's internal passageway, and/or (2) in the event that the elastomeric tube has already been wound on itself so as to close down the tube's internal passageway, the elastomeric tube can be unwound off itself so as to progressively open up the tube's internal passageway. The novel seal further includes locking means for releasably maintaining the first and second housings in a selected position relative to one another.

Preferably, the first housing, the second housing and the elastomeric tube are all coaxially aligned with one another, so as to facilitate opening up or closing down the passageway which extends through the tube, and so as to facilitate passing elongated tools through the seal.

In one preferred embodiment, the first and second housings are disposed opposite one another so that the first opening faces the second opening, and the elastomeric tube extends between the two openings, with the second end of the elastomeric tube being attached to the second housing so that the tube's internal passageway is sealingly connected to the second opening, whereby the first opening will be connected to the second opening via the elastomeric tube's internal passageway, and with the second opening communicating with a second environment.

In another preferred embodiment, the second housing is mounted concentrically about the first housing so that the first housing is received in the second opening, and the elastomeric tube is folded back over itself, with the second end of the elastomeric tube being attached to the second housing, so as to connect a second environment with the first environment via the elastomeric tube's internal passageway.

BRIEF DESCRIPTION OF THE DRAWINGS

Still other objects and features of the present invention will be more fully disclosed or rendered obvious by the following detailed description of the invention, which is to be considered together with the accompanying drawings wherein like figures refer to like parts, and further wherein.

DETAILED DESCRIPTION OF THE INVENTION

Looking first at FIGS. 1–9, there is shown a novel seal 103 which constitutes one embodiment of the present invention.

Figure 1:
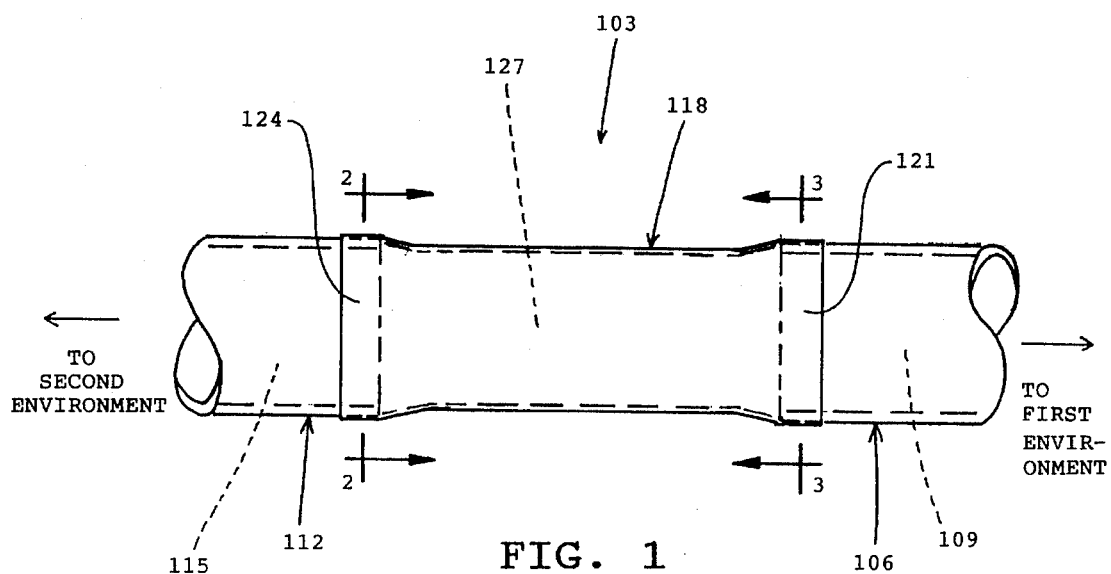
FIG. 1 is a side view showing a first seal formed in accordance with the present invention, wherein that seal is shown disposed in its fully open position.
Figure 2:
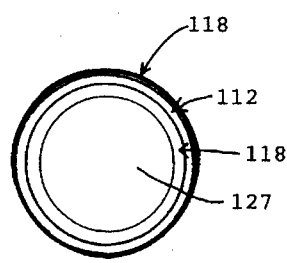
FIG. 2 is a sectional view taken along line 2—2 of FIG. 1.
Figure 3:
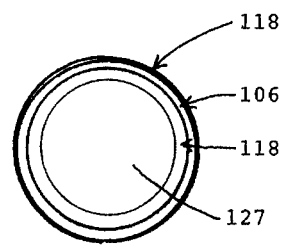
FIG. 3 is a sectional view taken along line 3—3 of FIG. 1.

More particularly, and looking now at FIGS. 1–3, seal 103 comprises a first substantially rigid housing 106 defining a first opening 109 communicating with a first environment, a second substantially rigid housing 112 defining a second opening 115 communicating with a second environment, and an elastomeric tube 118 having a first end 121 and a second end 124 and defining an internal passageway 127 therebetween. The elastomeric tube's first end 121 is securely attached to first housing 106 so that the tube's internal passageway 127 is sealingly connected to first opening 109, and the elastomeric tube's second end 124 is securely attached to second housing 112 so that the tube's internal passageway 127 is sealingly connected to second opening 115, whereby first opening 109 will be connected to second opening 115 via the elastomeric tube's internal passageway 127.

Preferably first housing 106 and second housing 112 comprise a pair of like-sized, substantially rigid tubes, and elastomeric tube 118 comprises a resilient tubular body sized, when in its relaxed state, to have an internal diameter slightly smaller than the outer diameter of tubes 106 and 112, whereby first end 121 of tube 118 can be fit over first tube 106 so that the resilient tube's internal passageway 127 is sealingly connected to first opening 109, and second end 124 of tube 118 can be fit over second tube 112 so that the resilient tube's internal passageway 127 is sealingly connected to second opening 115. See FIGS. 1–3. Elastomeric tube 118 is preferably formed out of a relatively soft, relatively strong elastomer, and is preferably made so as to be relatively thin. By way of example, elastomeric tube 118 might be formed out of a soft, natural rubber latex such as that commonly used to make medical examination gloves, and might be made so as to have a similar thickness; and/or elastomeric tube 118 might be formed out of an elastomer of the type commonly used to make condoms, and might be made so as to have a similar thickness. Of course, the specific composition and construction of elastomeric tube 118 will depend somewhat on the application involved, as will be recognized by one skilled in the art.

Figure 4:
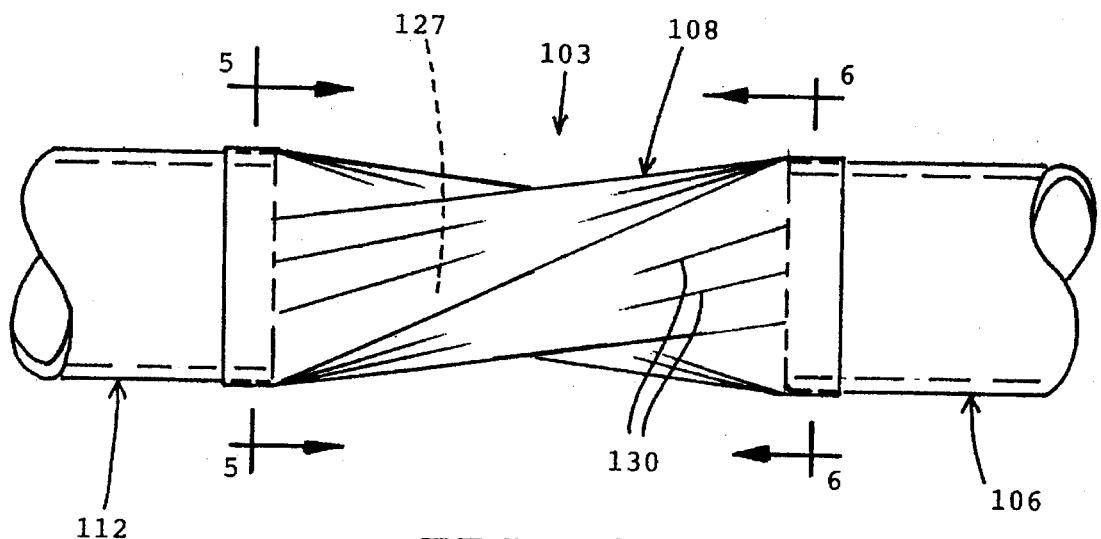
FIG. 4 is a side view of the same seal shown in FIGS. 1–3, except that the seal is shown disposed in a partially closed position.
Figure 5:
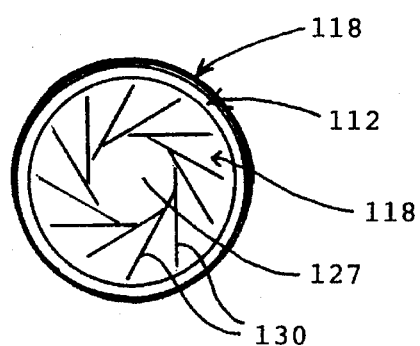
FIG. 5 is a sectional view taken along line 5—5 of FIG. 4.
Figure 6:
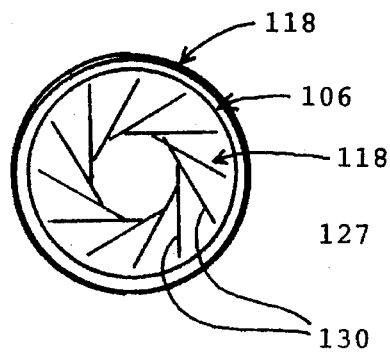
FIG. 6 is a sectional view taken along line 6—6 of FIG. 4.

First housing 106 and second housing 112 are axially rotatable relative to one another, whereby (1) elastomeric tube 118 can be wound on itself so as to progressively close down the passageway 127 extending through elastomeric tube 118, and/or (2) in the event that the elastomeric tube has already been wound on itself so as to close down the tube's internal passageway, the elastomeric tube can be unwound off itself so as to progressively open up the tube's internal passageway. See FIGS. 1–3, which show elastomeric tube 118 in a completely unwound state and with passageway 127 in a fully open position; FIGS. 4–6, which show elastomeric tube 118 in a somewhat wound state so that fold lines 130 appear therein and with passageway 127 in a partially closed position; and FIGS. 7–9, which show elastomeric tube 118 in a significantly wound state so that fold lines 130 appear therein and with passageway 127 completely closed off by the twisted walls of elastomeric tube 118.

On account of the foregoing, it will be appreciated that when first housing 106 is connected to a first environment so that first opening 109 communicates with that first environment, and when second housing 112 is connected to a second environment so that second opening 115 communicates with that second environment, with either one or both of the housings 106 and 112 being axially rotatable relative to one another, elastomeric tube 118 can be wound or unwound on itself so as to function as a variable diameter passageway to regulate the flow of materials from one environment to the other.

Thus, for example, housings 106 and 112 could be set relative to one another so that elastomeric tube 118 is completely unwound and passageway 127 is fully open, whereby maximum flow of materials can occur through the passageway 127 between the two environments (see FIGS. 1–3); or housings 106 and 112 could be set relative to one another so that elastomeric tube 118 is significantly wound on itself so that fold lines 130 appear and passageway 127 is completely closed off, whereby no flow of materials whatsoever can occur through the passageway 127 between the two environments (see FIGS. 7–9); or housings 106 and 112 could be set at some intermediate position relative to one another so that elastomeric tube 118 is somewhat wound on itself so that fold lines 130 appear and passageway 127 is partially closed off, whereby a restricted flow of materials can occur through the passageway 127 between the two environments (see FIGS. 4–6). In this way it will be seen that seal 103 essentially forms a continuously variable valve which can be used to regulate the flow of material between one environment and the other.

It will be appreciated that as first and second housings 106 and 112 are axially rotated relative to one another, so that the walls of tube 118 are progressively twisted more and more so as to close down (or completely close off) passageway 127, the twisting elastomeric tube 118 will create forces that will tend to draw the first and second housings 106 and 112 together. In the event that one or both of the housings 106 and 112 are free to move axially, such forces will cause housings 106 and 112 to advance towards one another as the tube 118 becomes progressively more twisted. In the event that neither of the housings 106 and 112 is free to move axially (i.e., because of the presence of some sort of constraining structure, not shown), the elastomeric material of tube 118 will itself tend to yield axially so as to permit tube 118 to wind on itself without any axial movement of housings 106 and 112 relative to one another. This latter scenario is exemplified in FIGS. 1–3, 4–6 and 7–9, in which housings 106 and 112 do not move progressively closer to one another as tube 118 is progressively wound more and more on itself.

Figure 10:
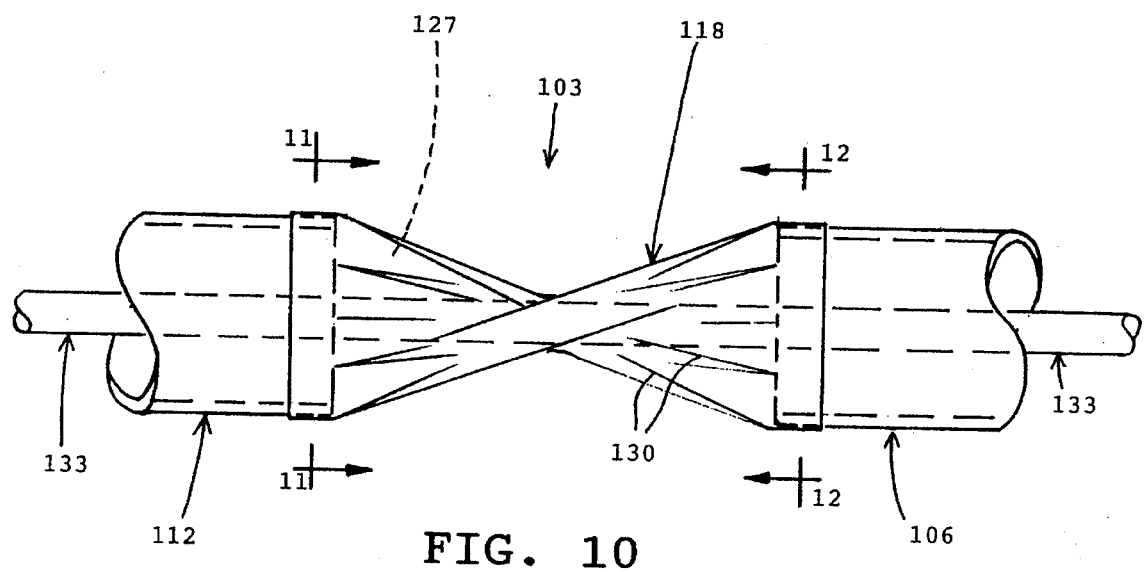
FIG. 10 is a side view of the same seal shown in FIGS. 7–9, except that an elongated tool has been passed through the seal.
Figure 11:
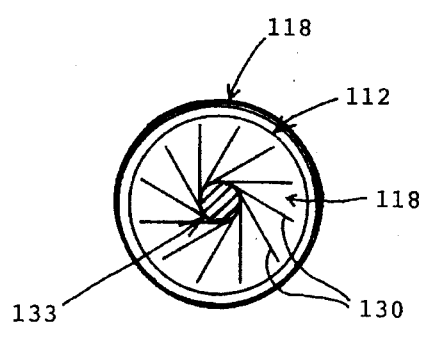
FIG. 11 is a sectional view taken along line 11—11 of FIG. 10.
Figure 12:
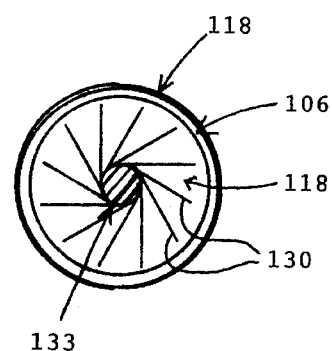
FIG. 12 is a sectional view taken along line 12—12 of FIG. 10.

It will also be appreciated that the resilient nature of elastomeric tube 118 permits seal 103 to accommodate and form a sealing fit about a tool passing through the seal. More particularly, and looking next at FIG. 10–12, there is shown a tool 133 which extends through seal 103. Tool 133 can be passed through passageway 127 while the passageway is fully or partially open, and then the housings 106 and 112 axially rotated relative to one another so that the seal's elastomeric tube 118 securely engages the periphery of tool 133 so as to prevent any material from passing between the tool and the surrounding seal. Furthermore, the elastic nature of tube 118 permits this sealing engagement between tool 133 and tube 118 to be reliably maintained even as tool 133 is moved about axially relative to the seal, and even as the tool 133 is moved about radially relative to the seal. Of course, if for any reason it should be found that a particular seal setting fails to provide a satisfactory degree of sealing with the tool 133, the housings 106 and 112 need only be further axially rotated relative to one another so as to provide a tighter seal about tool 133. If desired, housings 106 and 112 can thereafter be further axially rotated relative to one another so as to open up passageway 127 some or all of the way, and then the tool 133 withdrawn from across the passageway.

Figure 7:
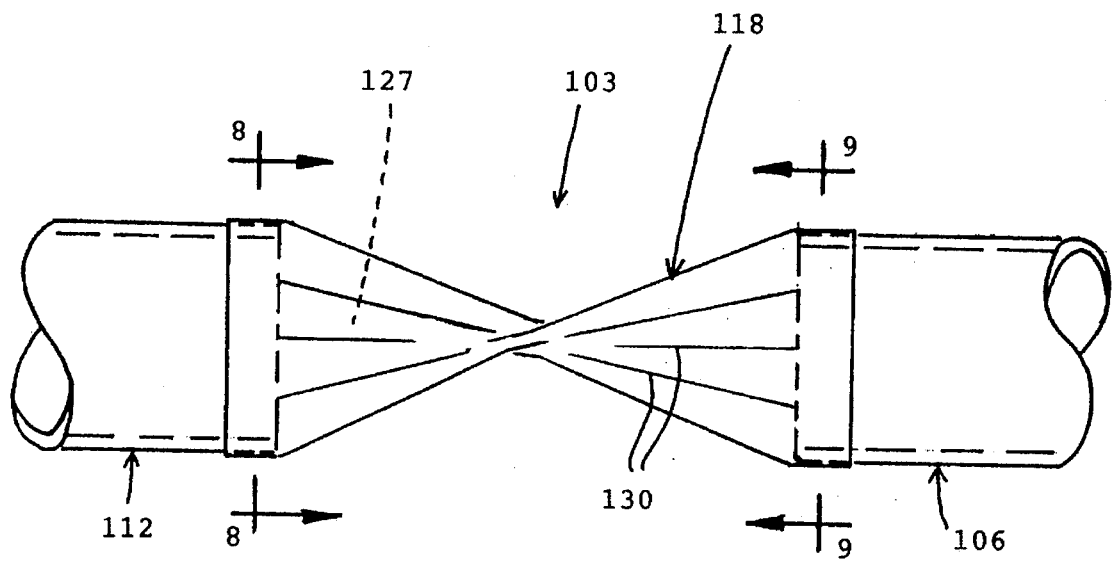
FIG. 7 is a side view of the same seal shown in FIGS. 1–6, except that the seal is shown disposed in its fully closed position.
Figure 8:
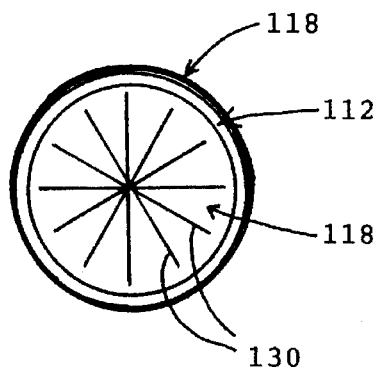
FIG. 8 is a sectional view taken along line 8—8 of FIG. 7.
Figure 9:
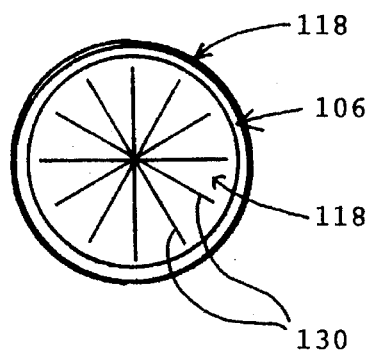
FIG. 9 is a sectional view taken along line 9—9 of FIG. 7.

The resilient nature of elastomeric tube 118 also permits the seal 103 to be set in the position shown in FIGS. 7–9, i.e., so that no material may pass by the seal, and then a tool 133 passed through the closed seal so that the tool extends across the seal while the seal prevents material from flowing past the seal. In this way it will be seen that seal 103 can be used to seal off two environments from one another, yet will sealingly accommodate a tool or other object extending across the seal and between the two environments, whereby the distal working end of the tool can be located in one environment while the proximal actuating end of the same tool can be located in another environment. Furthermore, the resilient nature of elastomeric tube 118 will also cause seal 103 to close off again if and when tool 133 is thereafter withdrawn from across the seal. The resilient nature of the tube 118, combined with the continuously variable degree of closure provided by the relative rotation of housings 106 and 112, ensures that seal 103 can accomodate and establish a reliable seal with a wide variety of different tools having a wide variety of different cross-sectional profiles.

If desired, a surface lubricant of the sort well known in the art can be placed on elastomeric tube 118 so as to facilitate passage of tool 133 through the seal; alternatively, tube 118 could be formed out of a lubricant-impregnated elastomer of the sort well known in the art.

It will also be appreciated that the resilient nature of tube 118 will cause the tube to try to return to an untwisted state whenever the tube has been twisted on itself. In other words, whenever tube 118 has been wound on itself in the manner previously described so as to cause passageway 127 to become constricted (e.g in the manner shown in FIGS. 4–6 or 7–9), the resilient nature of tube 118 will act to urge the seal to return to its unwound position (i.e., to the position shown in FIGS. 1–3), wherein the tube 118 is untwisted and passageway 127 is completely open. Thus it will be seen that the resilient nature of tube 118 imparts a natural bias to seal 103, continuously urging it to return to the position shown in FIGS. 1–3 whenever tube 118 has been wound on itself (e.g. in the manner shown in FIGS. 4–6 or 7–9). Of course, in many situations it is necessary to hold seal 103 in some wound position (e.g. in the position shown in FIGS. 4–6 or the position shown in FIGS. 7–9), and to this end it is desirable to provide some sort of locking means to releasably maintain first housing 106 and second housing 112 in some particular orientation relative to one another. Such locking means are shown generally at 136 in FIGS. 13–15.

Figure 13:
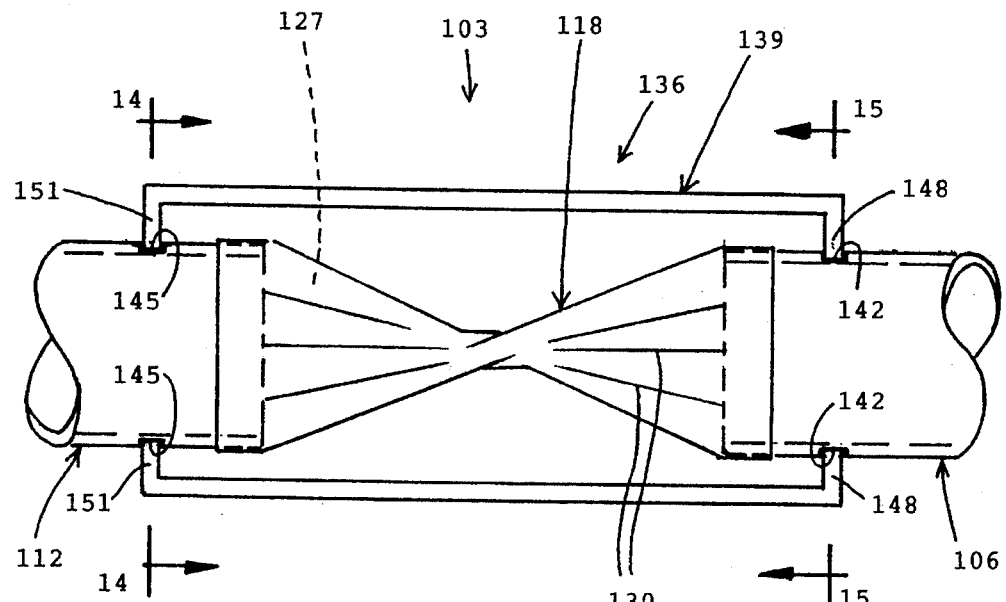
FIG. 13 is a side view of the same seal shown in FIGS. 7–9, except that locking means have been added to the seal to releasably hold the first and second housings in a selected position relative to one another.
Figure 14:
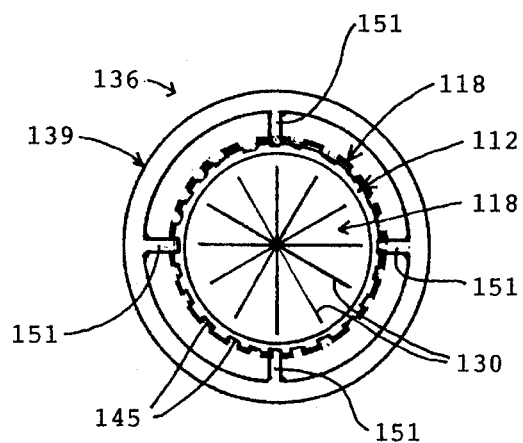
FIG. 14 is a sectional view taken along line 14—14 of FIG. 13.
Figure 15:
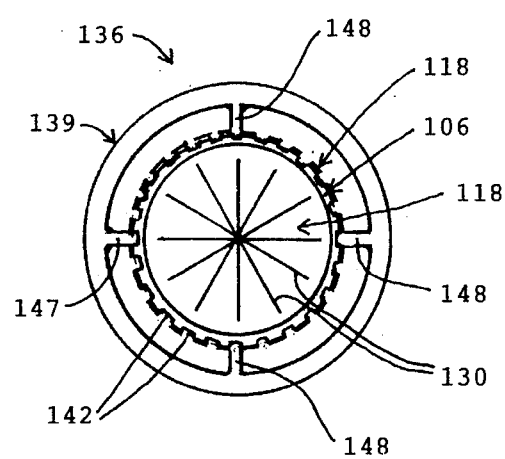
FIG. 15 is a sectional view taken along line 15—15 of FIG. 13.

More particularly, and looking now at FIGS. 13–15, locking means 136 comprises an outer housing 139 which concentrically surrounds first seal housing 106 and second seal housing 112. Seal housing 106 includes a plurality of equally spaced, radially-extending blind holes 142. Holes 142 are set outboard of where elastomeric tube 118 joins seal housing 106. Similarly, seal housing 112 includes a plurality of equally-spaced, radially-extending blind holes 145. Holes 145 are set outboard of where elastomeric tube 118 joins seal housing 112. In essence, blind holes 142 and 145 provide equally-spaced, radially-extending surface openings extending into their respective housings. However, holes 142 and 145 are blind in the sense that they do not penetrate all the way through their respective housings 106 and 112 so as to communicate with openings 109 and 115, respectively.

Outer housing 139 includes a plurality of equally-spaced, radially-extending flexible fingers 148 which extend inward from housing 139 so as to engage aligned ones of surface openings 142. Similarly, a plurality of equally-spaced, radially-extending flexible fingers 151 extend inward from housing 139 so as to engage aligned ones of surface openings 145. The interaction of fingers 148 and surface openings 142, and the interaction of fingers 151 and surface openings 145, provides an adjustable locking mechanism to yieldably hold housing members 106 and 112 in position relative to one another. More specifically, fingers 148 engage surface openings 142 so as to normally hold housing 106 in position relative to housing 139. However, by forming fingers 148 out of a somewhat flexible material, fingers 148 can yield under operator urging so as to permit the angular position of housing 106 to be adjusted relative to housing 139, whereupon fingers 148 will engage other aligned surface openings 142 so as to again hold the housing 106 still relative to housing 139. Similarly, fingers 151 engage surface openings 145 so as to normally hold housing 112 in position relative to housing 139. Again, however, by forming fingers 151 out of a somewhat flexible material, fingers 151 can yield under operator pressure so as to permit the angular position of housing 112 to be adjusted relative to housing 139, whereupon fingers 151 will engage other aligned surface openings 145 so as to again hold the housing 112 still relative to housing 139.

Figure 16:
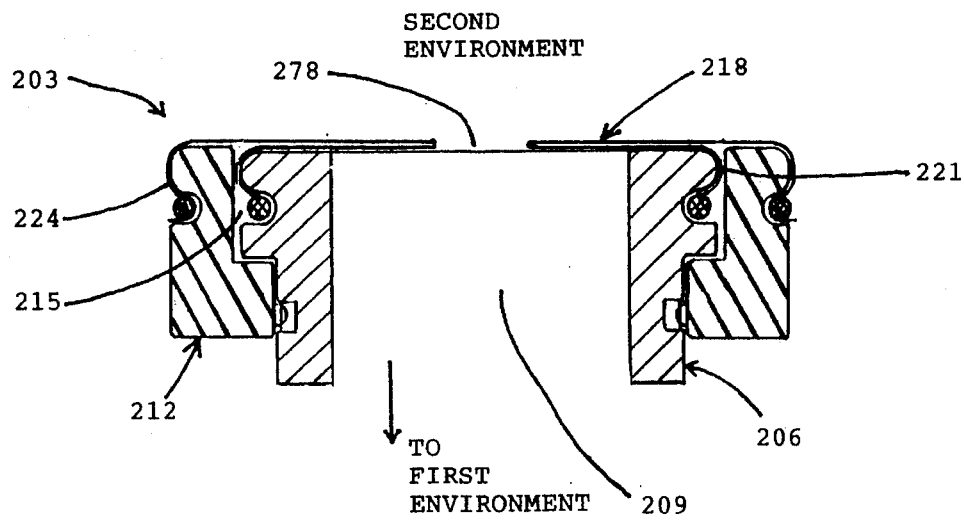
FIG. 16 is a side view showing a second seal formed in accordance with the present invention, wherein the seal is disposed in a partially closed position.
Figure 17:
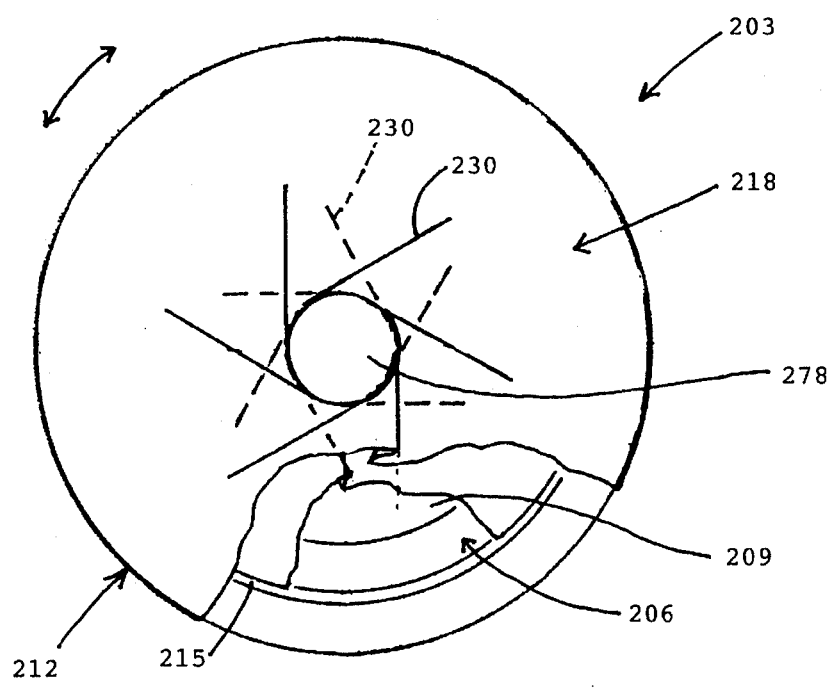
FIG. 17 is a top view of the same seal shown in FIG. 16.

Looking next at FIGS. 16 and 17, there is shown a novel seal 203 which constitutes a second embodiment of the invention. In this embodiment, the ends of the first and second housings, to which the first and second ends of the elastomeric tube are attached, are located concentrically to one another, in substantially the same plane transverse to their common longitudinal axis.

Figure 18:
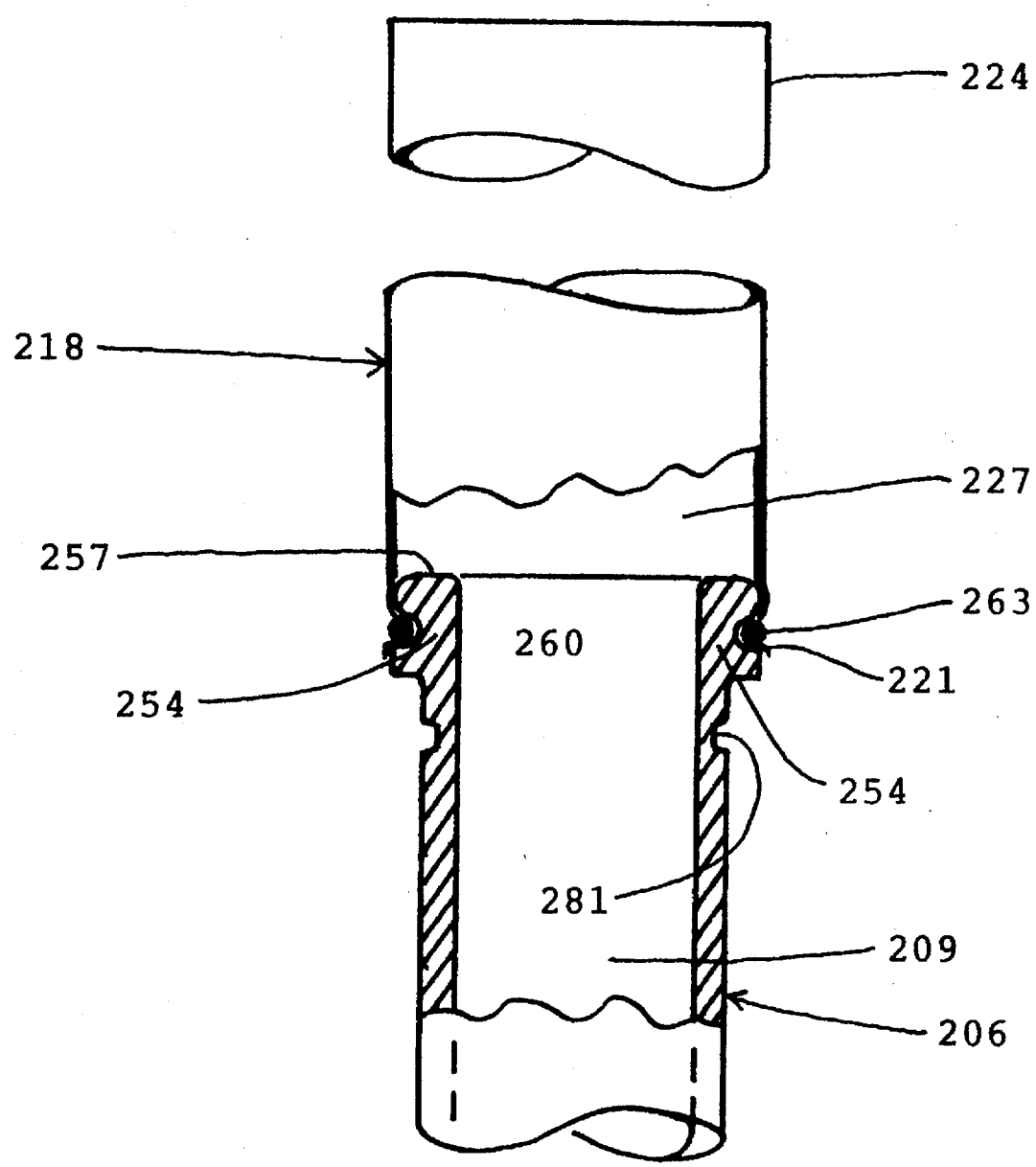
FIG. 18 is a side view in partial section showing the first end of the elastomeric tube attached to the first housing.
Figure 19:
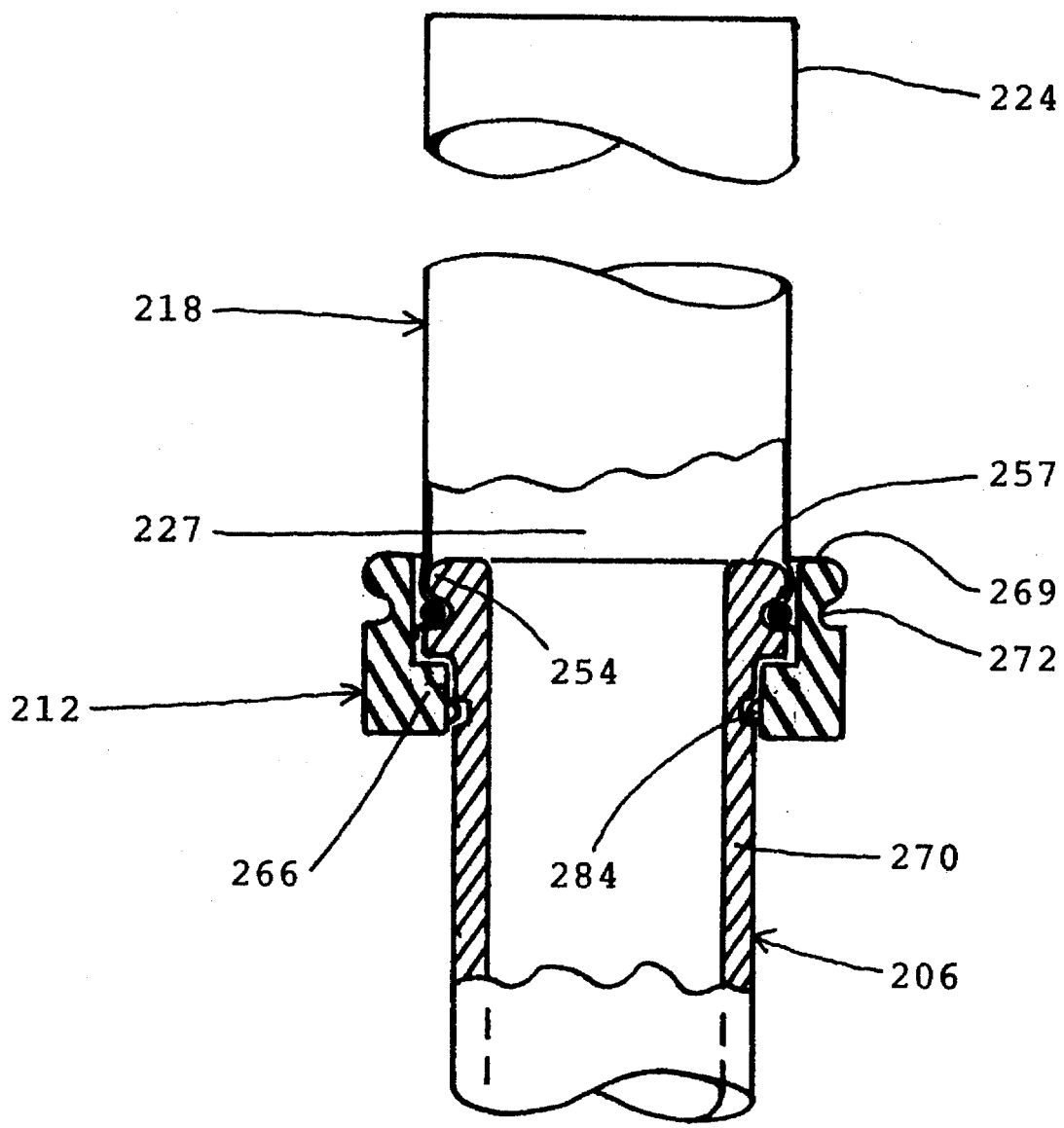
FIG. 19 is a side view in partial section of the assembly shown in FIG. 18, and also showing the second housing positioned concentrically about the first housing, but without the second end of the elastomeric tube being attached to the second housing.

More specifically, seal 203 comprises a first substantially rigid tubular housing 206 defining a first opening 209, a second substantially rigid tubular housing 212 defining a second opening 215, and an elastomeric tube 218 having a first end 221 and a second end 224 and defining an internal passageway 227 therebetween (see FIGS. 18 and 19). The elastomeric tube's first end 221 is securely attached to first tubular housing 206 so that the tube's internal passageway 227 is sealingly connected to first opening 209 (FIG. 18), and the elastomeric tube's second end 224 is securely attached to second tubular housing 212 (FIGS. 16 and 20) so that the tube 218 is sealingly connected to second opening 215.

Figure 20:
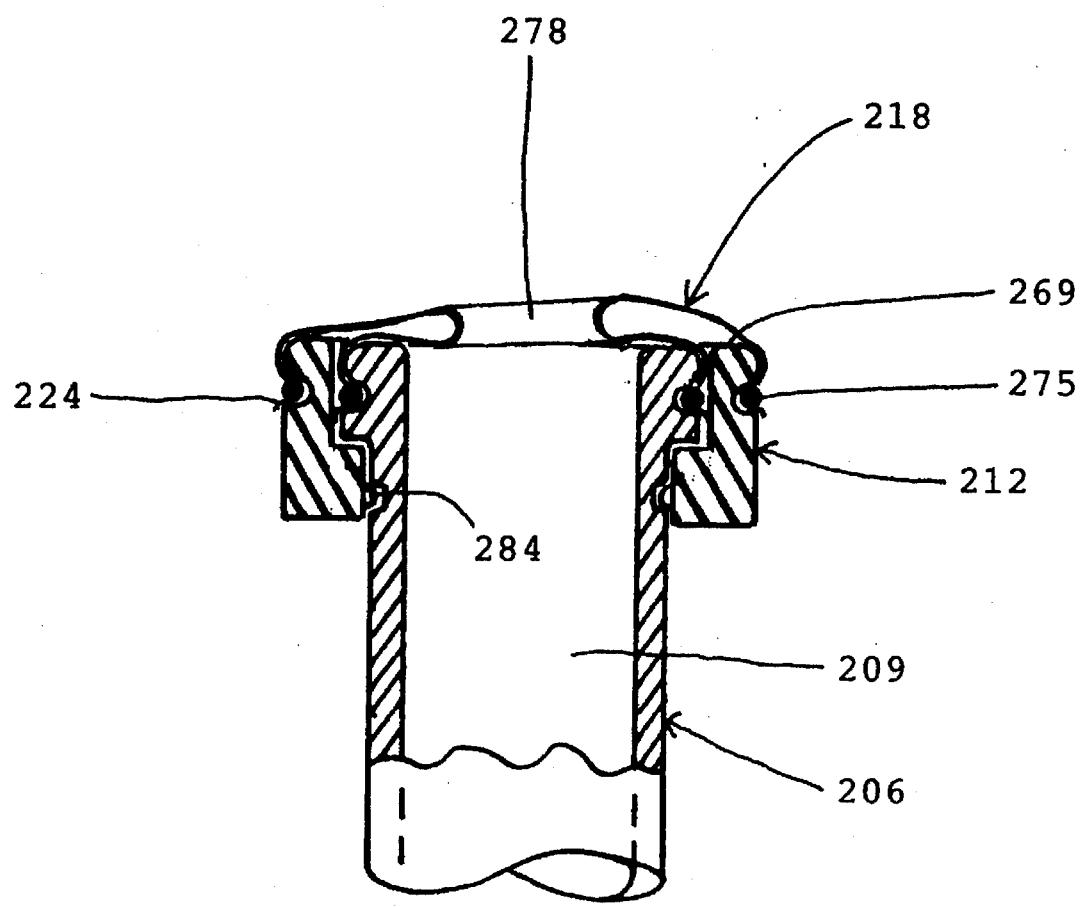
FIG. 20 is a side view in partial section of the assembly shown in FIG. 19, and also showing the the second end of the elastomeric tube attached to the second housing, wherein the seal is disposed in its fully open position.

The details of the foregoing construction will be better understood with reference to FIGS. 18–20. Looking first at FIG. 18, it will be seen that first tubular housing 206 has a radially-extending annular flange 254 adjacent its open end 257. An annular groove 260 extends completely around flange 254. The first end 221 of elastomeric tube 218 is pulled over flange 254 and an elastic O-ring 263 engages first end 221 of tube 218 as the O-ring seats in annular groove 260 so as to hold the first end 221 of the elastomeric tube 218 to first housing 206. It will be appreciated that in view of the foregoing construction, the tube's internal passageway 227 will be sealingly connected to the housing's first opening 209.

Looking next at FIG. 19, second tubular housing 212 is disposed about first tubular housing 206 adjacent flange 254. Second tubular housing 212 is sized so that second passageway 215 is large enough to accommodate flange 254 of first tubular housing 206 in the manner shown. Second tubular housing 212 includes an inwardly extending annular flange 266 located opposite its open end 269. The inner diameter of flange 266 is slightly greater than the external diameter of the body 270 of first tubular housing 206, and somewhat less than the external diameter of flange 254, whereby second tubular housing 212 can ride about the body 270 of first tubular housing 206 but cannot come off the open end 257 of first tubular housing 206 because of the engagement of flange 254 with flange 266. Second tubular housing 212 also includes an annular groove 272 disposed adjacent its open end 269.

Looking next at FIG. 20, the second end 224 of elastomeric tube 218 is pulled back over the open end 269 of second tubular housing 212, and an elastic O-ring 275 engages second end 224 as the O-ring seats in annular groove 272 so as to secure the second end 224 of tube 218 to second tubular housing 212. By virtue of this arrangement, elastomeric tube 218 will structurally connect second housing 212 to first housing 218, and will keep the two housing members positioned so that their flanges 254 and 266 generally approach one another.

Figure 21:
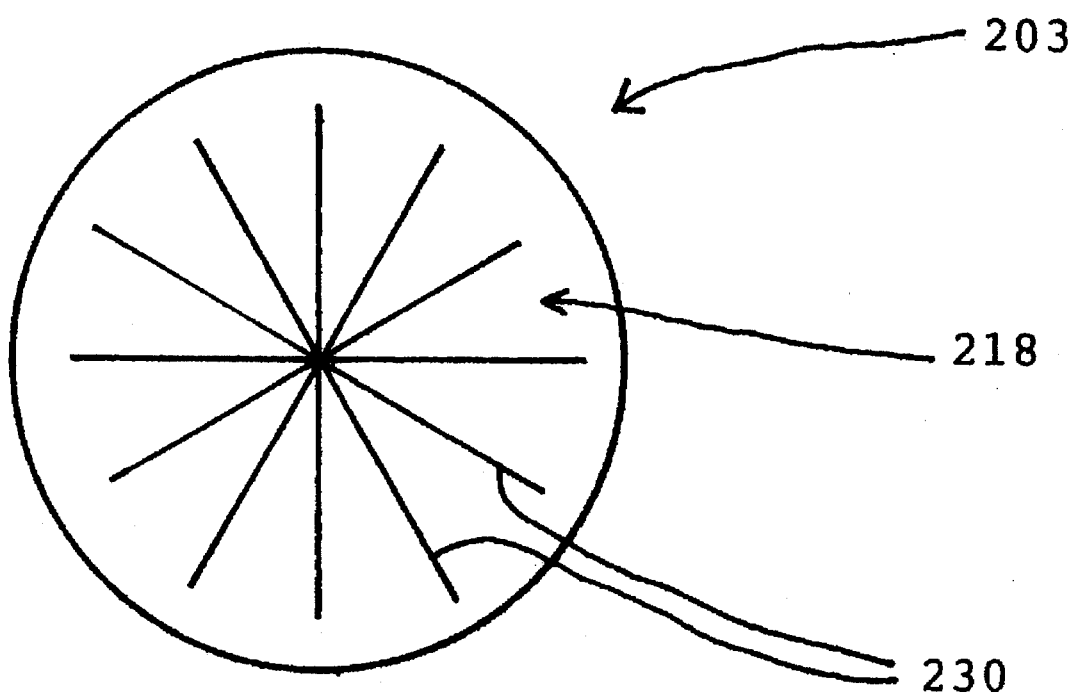
FIG. 21 is a top view of the seal shown in FIG. 20, except that the seal is shown disposed in a fully closed position.
Figures 22, 23:
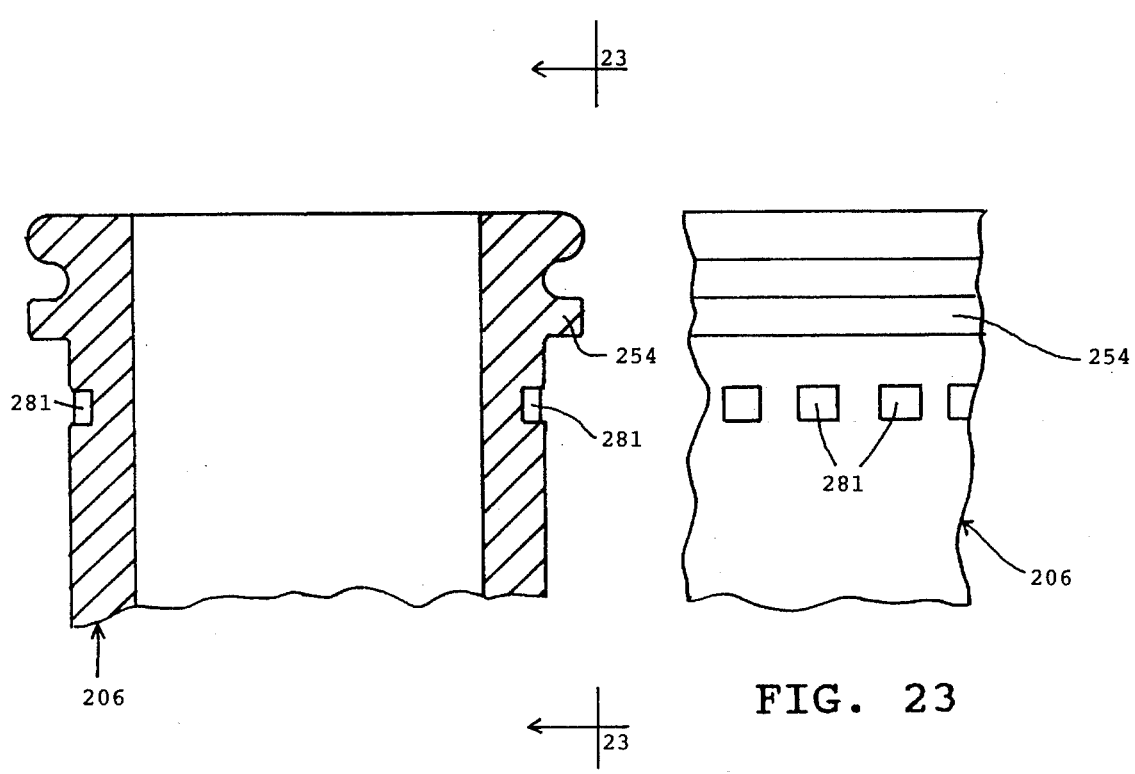
FIG. 22 is an enlarged side view of the first housing shown in FIGS. 16–20.
FIG. 23 is an enlarged side view taken along line 23—23 of FIG. 22.
Figure 24:
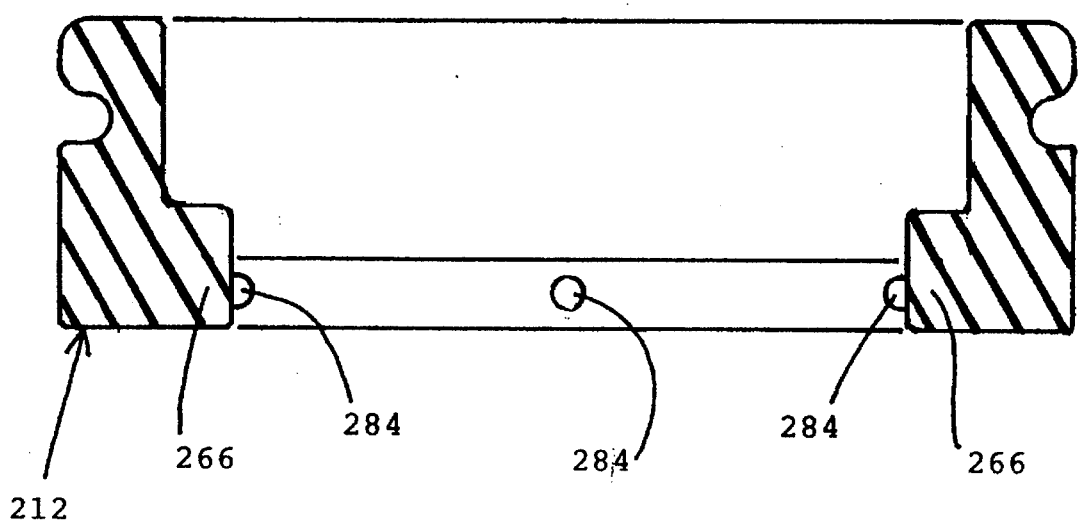
FIG. 24 is an enlarged side view of the second housing shown in FIGS. 16, 17, 19 and 20.

When tube 218 is connected to housings 206 and 212 in the foregoing manner, a passageway 278 will connect first opening 209 in first housing 206 with the region outside the seal, in the manner shown in FIG. 20. At the same time, however, inasmuch as housings 206 and 212 can be axially rotated relative to one another, tube 218 can be wound on itself so as to progressively close down passageway 278, in the manner shown in FIGS. 16 and 17. Fold lines 230 are created in tube 218 as tube 218 is wound on itself in this manner. Furthermore, by rotating housings 206 and 212 far enough relative to one another, tube 218 can be wound on itself so as to completely close off passageway 278, in the manner shown in FIG. 21. Again, fold lines 230 will be created in tube 218 as tube 218 is wound on itself. Alternatively, once tube 218 has been wound on itself so as to close down passageway 278, housings 206 and 212 can be rotated relative to one another so as to open up passageway 278 once again.

Thus it will be seen that when seal 203 is disposed so that its first opening 209 is connected to a first environment and its tube 218 is in contact with a second environment, in the manner shown in FIG. 16, seal 203 can function as a continously variable seal to regulate the flow of materials between the first environment and the second environment. For example, housing 206 and 212 could be set relative to one another so that elastomeric tube 218 is completely unwound and passageway 278 is completely open, whereby maximum flow of materials can occur through passageway 278 (see FIG. 20); or housings 206 and 212 could be set so that elastomeric tube 218 is significantly wound on itself, so that fold lines 230 appear and passageway 278 is completely closed off (see FIG. 21) so that no material can pass from one environment to the other; or housings 206 and 212 could be set at some intermediate position relative to one another so that elastomeric tube 218 is somewhat wound on itself so that fold lines 230 appear and passageway 278 is somewhat open, whereby a restricted flow of material can occur through passageway 278 (see FIGS. 16 and 17).

As is the case with seal 103 shown in FIGS. 1–15, seal 203 is also fully capable of accomodating and forming a sealing fit about a tool passing through the seal. Again, depending on the situation, seal 203 can be first opened to receive a tool and then closed down to seal about the positioned tool, or seal 203 can be closed down to completely close off the passageway 278 and then the tool pushed through the elastomeric material of tube 218. In either case, tube 218 can form a reliable seal about the tool even if the tool should thereafter be moved about axially or radially during use. Also, as is the case with seal 103 shown in FIGS. 1–15, a surface lubricant can be placed on elastomeric tube 218 so as to facilitate passage of a tool through the seal, or tube 218 could be formed out of a lubricant-impregnated elastomer.

Since the resilient nature of tube 218 will cause the tube to try to return to an untwisted state whenever it has been twisted on itself, it is desirable to provide some sort of locking means to releasably maintain first and second housings 206 and 212 in some particular orientation relative to one another. Looking now at FIGS. 16, 18–20 and 22–24, it will be seen that first housing 206 includes a plurality of spaced detents 281 encircling the housing adjacent to annular flange 254. Detents 281 are engaged by corresponding spaced projections 284 located on the inner edge of flange 266 so that as the first and second tubular housings are rotated relative to one another, the projections 284 snap into and out of the detents 281 in a rachet sort of action. This permits first housing 206 and second housing 212 to be maintained in a particular orientation to one another.

Figure 25:
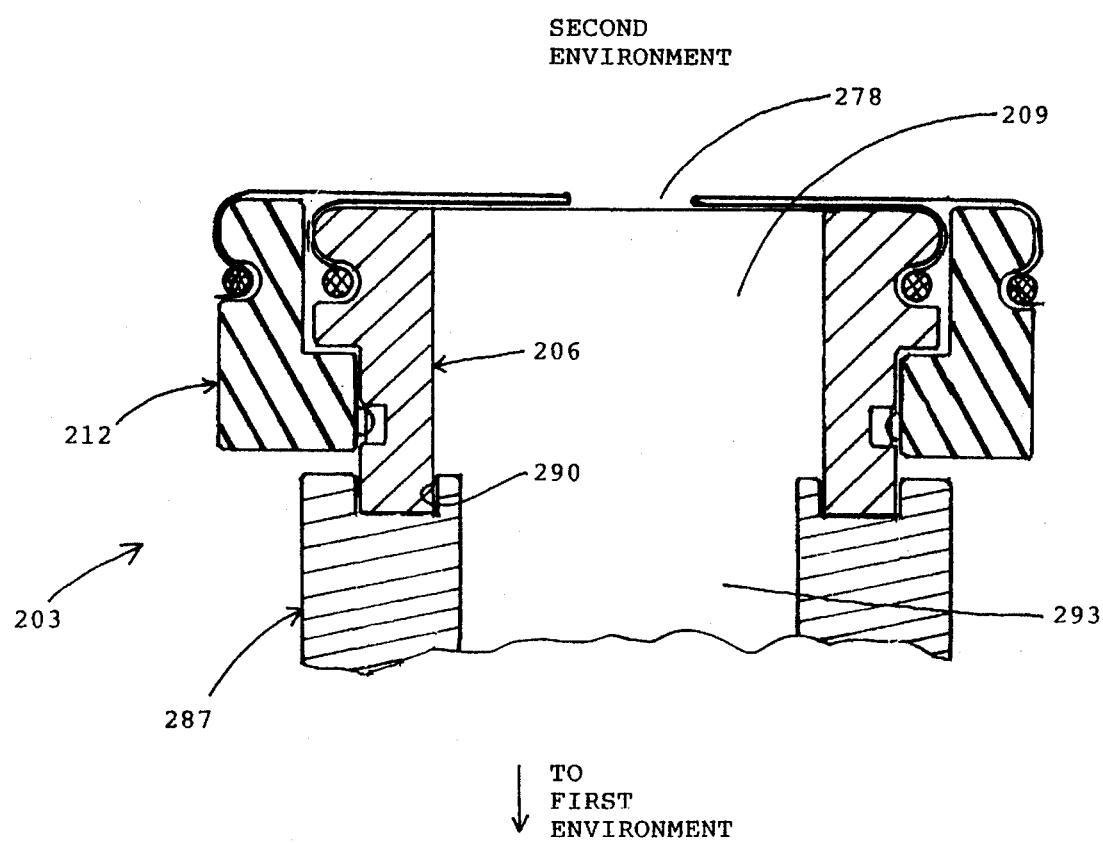
FIG. 25 is an enlarged side view of the seal shown in FIG. 16, wherein the free end of the first housing is shown attached to another device.

Seal 203 might be built directly onto a housing of a device which is to utilize the seal, or it might be added to a device already built. FIG. 25 illustrates one way in which seal 203 might be utilized in this manner. More particularly, seal 203 is formed as a separate assembly for attachment to a housing 287 which includes an annular groove 290 and a passageway 293 connected to a first environment. Depending on the particular application at hand, housing 287 might be a flexible tube, a substantially rigid tubular element such as a cannula, or even the outer wall of an enclosure. Seal 203 has one end of its first housing 206 inserted into housing groove 290 so as to mount the seal onto housing 287 in a sealing engagement, whereby first passageway 209 will communicate with the first environment via passageway 293. On account of this construction, it will be seen that the seal's passageway 278 can connect the second environment with the first environment on command.

Figure 26:
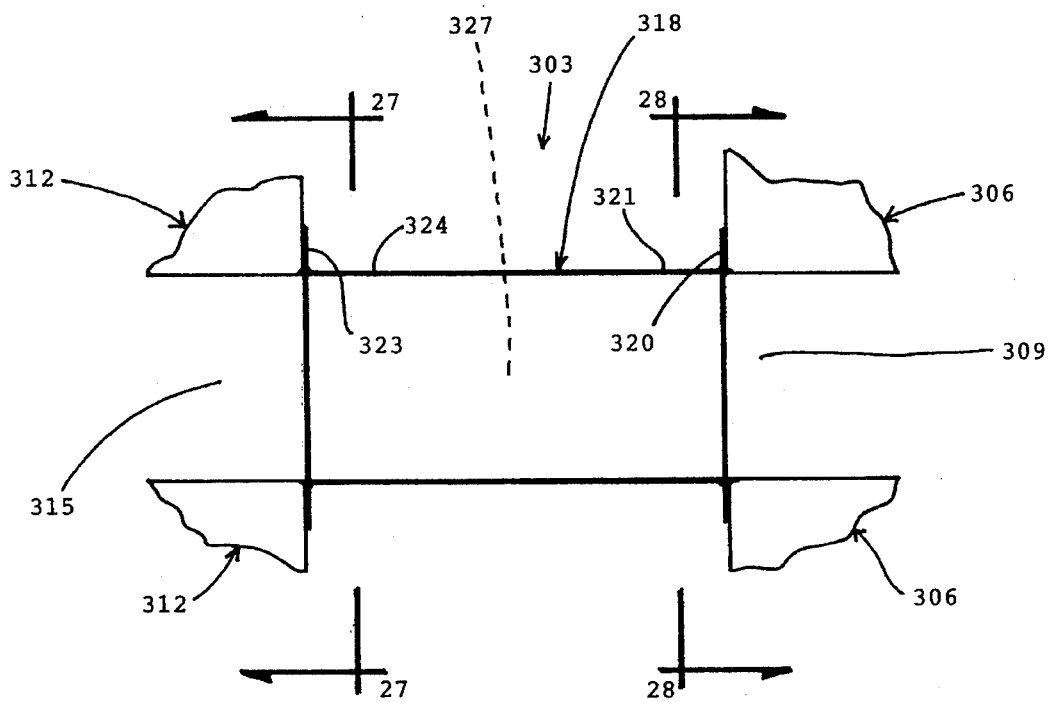
FIG. 26 is a side view showing a third seal formed in accordance with the present invention.
Figures 27, 28:
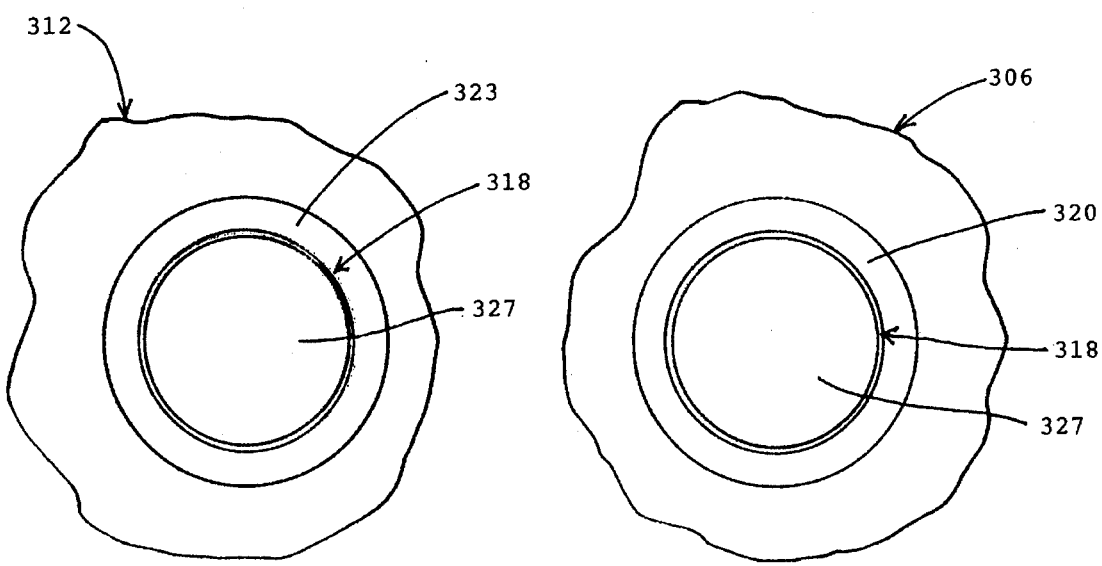
FIG. 27 is a sectional view taken along line 27—27 of FIG. 26.
FIG. 28 is a sectional view taken along line 28—28 of FIG. 26.

It is also possible to connect the flexible tube to rotatable bodies other than hollow tubes such as those shown in FIGS. 1–25, and to modify the geometry of the tube somewhat at its ends to facilitate such attachment. Thus, for example, FIGS. 26–28 show a seal 303 formed by a first non-tubular body 306 defining a first opening 309, a second non-tubular body 312 defining a second opening 315, and a flexible tube 318 having an annular flange 320 at its first end 321, and an annular flange 323 at its second end 324. Tube 318 has its two ends 321 and 324 sealingly connected to bodies 306 and 312, respectively, using flanges 320 and 323, to mate tube 318 to bodies 306 and 312, respectively, so that first opening 309 is connected to second opening 315 by the tube's interior passageway 327.

Figure 29:
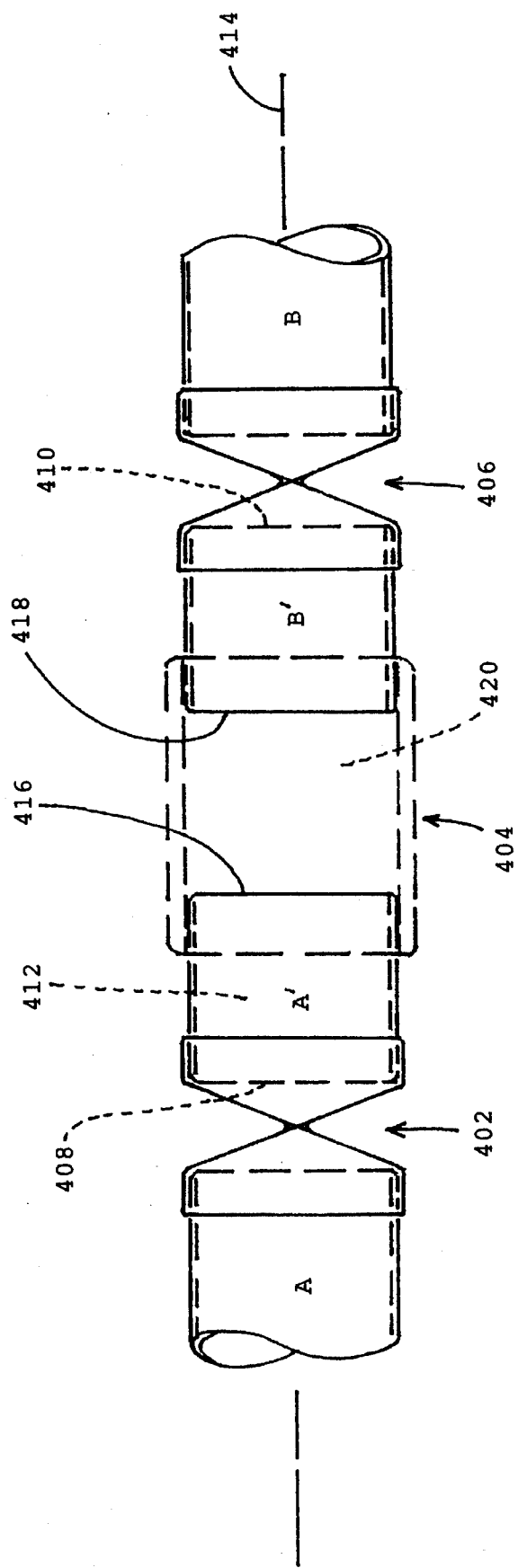
FIG. 29 is a side view showing two seals of the sort shown in FIGS. 1–16, wherein the two seals have been "ganged" together in series.
Figure 30:
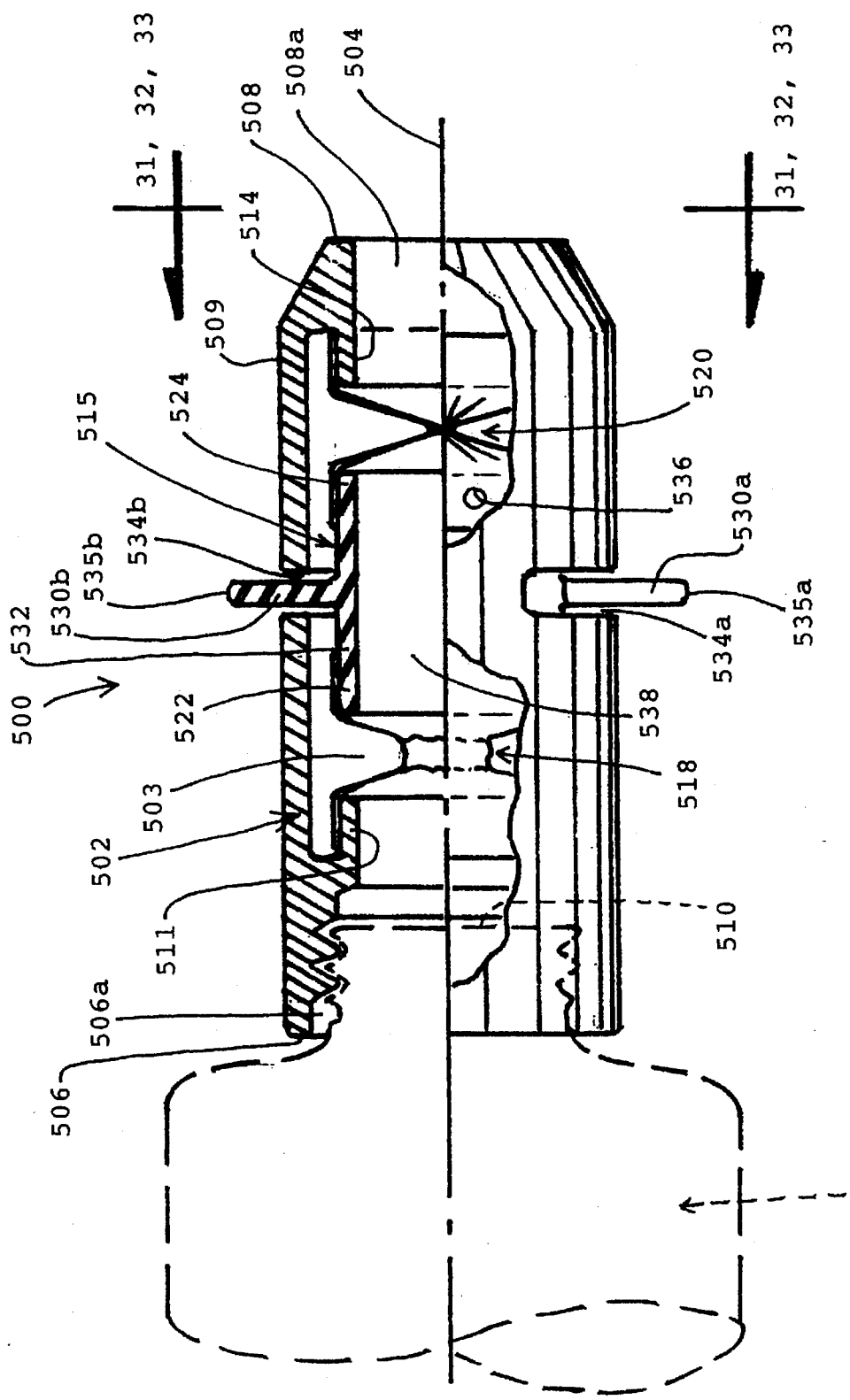
FIG. 30 is a side view showing a dispenser arrangement formed out of two seals such as those shown in FIGS. 1–16.

Multiple seals as described in detail above with reference to FIGS. 1–16 also may be "ganged" together in series in various ways depending upon the requirements of a specific application. This "ganged" configuration is generally illustrated in FIG. 29. In that illustration, an environment A is connected to an environment B by a passageway which extends through a first elastomeric tube seal 402, a connecting element, generally indicated at 404, and a second elastomeric tube seal 406. The connecting element 404 includes a left end 408 and a right end 410 connected by a lumen 412 extending along an axis 414 through the connecting element 404.

The connecting element 404 may be a unitary structure, whereby left end 408 is fixed to right end 410 and moves in unison with the same.

Alternatively, the connecting element 404 may include a left portion A' including left end 408 and a right end 416, and a right portion B' including right end 410 and a left end 418. Portions A' and B' may be co-axially aligned and connected together at right end 416 of portion A' and left end 418 of portion B' respectively so as to be rotatable relative to each other about axis 414.

In yet another alternative, portions A' and B' may be separately co-axially and rotatably connected to opposite ends of a central portion, illustratively indicated at 420, of the connecting element 404. Further, additional elastomeric tube seals and/or connecting elements may be added to the series configuration depicted in FIG. 29 as the particular application may require. For example, central portion 420 might be a substantially rigid tubular member or an elastomeric tube such as those utilized as tube seals 402 and 406.

The initial states of the several elastomeric tube seals 402, 406 depicted in FIG. 29 may be established such that either (1) one seal is in its open position while the other is in its closed position, (2) both seals are similarly either open or closed, or (3) the seals are each in a preselected configuration between their respective fully open and fully closed positions. Accordingly, it will be understood by those skilled in the art that the passageway between the two environments A and B may be re-configured as desired by an operator simply by rotation of the connecting element 404 (or portions A' and B' separately) about the axis of the seal relative to the fixed environments A and B, whereby the connecting passageway can be placed in either an entirely open state, an entirely closed state or a state in which different portions of the passageway are selectively open and closed.

Two particular examples of the "ganged" seal embodiment will now be described with reference to FIGS. 30–33 and FIG. 34, respectively. These examples are presented herein as illustrations of the numerous possible configurational possibilities utilizing the seal of the present invention in its broadest aspects, and should not be construed as in any way limiting of the scope of the invention.

Referring now to FIGS. 30–33, it will be recognized that numerous situations exist wherein it is desirable to repeatedly dispense a predetermined quantity of a substance from a container. For example, it is often convenient to dispense liquor from a bottle in individual "shots" in the course of mixing cocktails. Similarly, the capability to dispense various medicines (particularly those supplied in liquid form) in single dose quantities would be both convenient and avoid accidental overdose problems.

To accomplish these and other objectives, a seal assembly generally indicated at 500 is provided. The seal assembly 500 includes a hollow housing 502 defining an internal cavity 503. The cavity 503 is centered on an axis 504. The housing 502 includes a first end 506 defining an opening 506a and a second end 508 defining an opening 508a, the openings 506a and 508a being centered on the axis 504. An outer wall 509 connects the first end 506 to the second end 508 so as to define the cavity 503. Also, a tubular flange 514 extends inwardly from the periphery of opening 508a, parallel to axis 504.

The opening 506a is adapted to be attached to the open top of a bottle or similar container. This attachment may be unitary in nature such that the housing 502 and the walls of the container form a single piece structure. Alternatively, the opening 506a may be adapted for secure, but releasable, attachment to the open top of a bottle or similar container, e.g. by a screw mount. The latter alternative is representatively indicated by the threaded engagement of the open end 510 of bottle 512 with opening 506a in FIG. 30.

A "ganged" type seal is located within cavity 503 between an inwardly extending tubular flange 511 (centered about axis 504 generally adjacent to opening 506a) and the inwardly extending flange 514. That "ganged" seal includes a unitary, tubular connecting element 515 located co-axially along axis 504, and elastomeric tubular seals 518 and 520 located between the ends 522 and 524 of connecting element 515 and the flanges 511 and 514, respectively.

Opposite ends of seals 518 and 520 are securely attached to the connecting element 515 and flanges 511 and 514, respectively, such that in the "neutral" disposition of the "ganged" seal, which state is discussed in further detail hereinbelow, both seal 518 and seal 520 are wrapped upon themselves so as to be in a closed configuration. In the embodiment depicted in FIG. 30, this attachment is accomplished by telescoping the flanges 511 and 514 and the ends 522 and 524 of connecting element 515, respectively, into opposite ends of the elastomeric tube seals 518 and 520. Since the tube seals are formed out of a material which is elastically resilient in character, the selection of an internal diameter for the seals which is slightly smaller than the exterior diameter of the flanges and ends of the connecting element 515 results in an elastic grasping of the flanges and the ends of the connecting element by the seals 518 and 520. Other convenient mechanical means for affixing the ends of the seals to the flanges and to the ends of the connecting element 515 also may be utilized without departure from the present invention.

The connecting element 515 also includes rotationally spring-biased handles 530a and 530b which extend from the outer surface 532 of connecting element 515 outwardly through radial slots 534a and 534b in wall 509 of housing 502 to outer ends 535a and 535b, respectively. Slots 534a and 534b each extend along an equal circumferential portion of the wall 509 so as to allow an operator to selectively alter the rotational orientation of the connecting member 515 relative to the axis 504.

The spring bias for the handles 530 may be provided in any convenient manner. In the particular embodiment shown in FIGS. 31–33, for example, helical springs 550, 552, 554 and 556 are provided for this purpose. Specifically, (a) spring 550 extends between a pin 543a mounted on an inward projection 539a located adjacent the end 537a of slot 534b and a pin 545 located on handle 530b; (b) spring 552 extends between pin 545 located on handle 530b and a pin 543b mounted on inward projection 539b' adjacent end 537b of slot 534b; (c) spring 554 extends between pin 543b and a pin 547 located on handle 530a; and (d) spring 556 extends between pins 547 and 543a. Springs 550, 552, 554 and 556 are balanced with each other such that the handles 530a, 530b tend to be maintained substantially centered between the ends of their corresponding slots 534a and 534b in the "neutral" position, wherein both seals 518 and 520 are disposed in their closed configurations as illustratively shown in FIG. 31.

Figure 32:
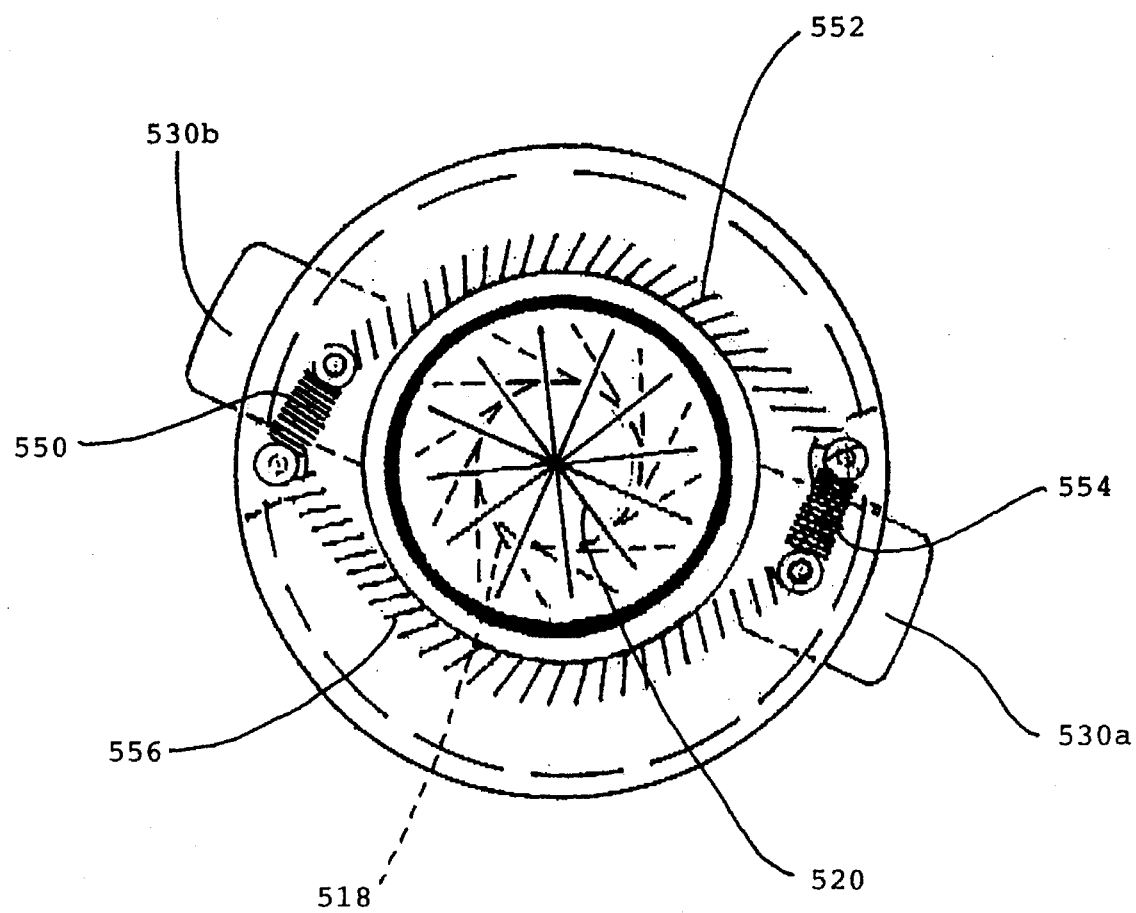
FIG. 32 is an end view taken along line 32—32 FIG. 30, with handles 530a and 530b having been rotated counterclockwise from the position shown in FIG. 31.
Figure 33:
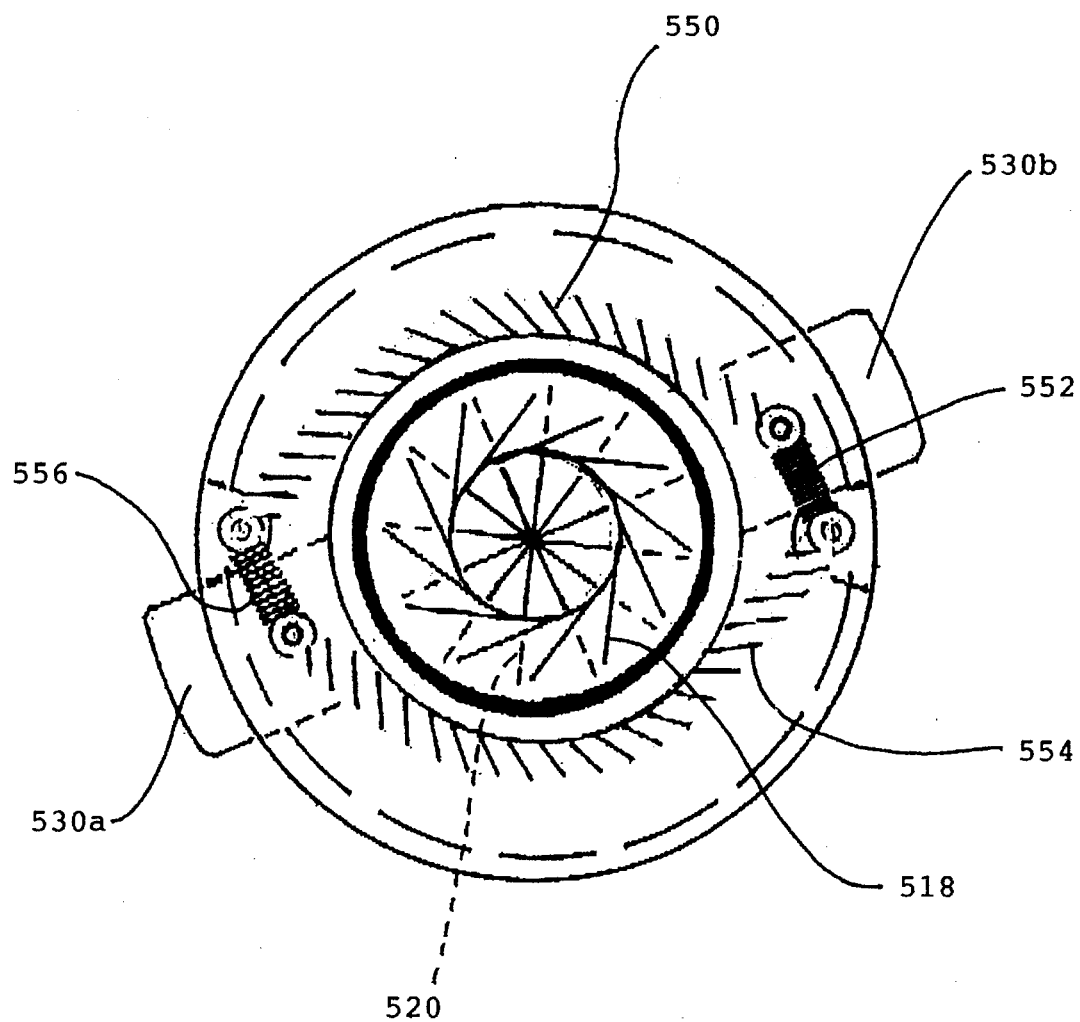
FIG. 33 is an end view taken along line 33—33 FIG. 30, with handles 530a and 530b having been rotated clockwise from the position shown in FIG. 31.
Figure 34:
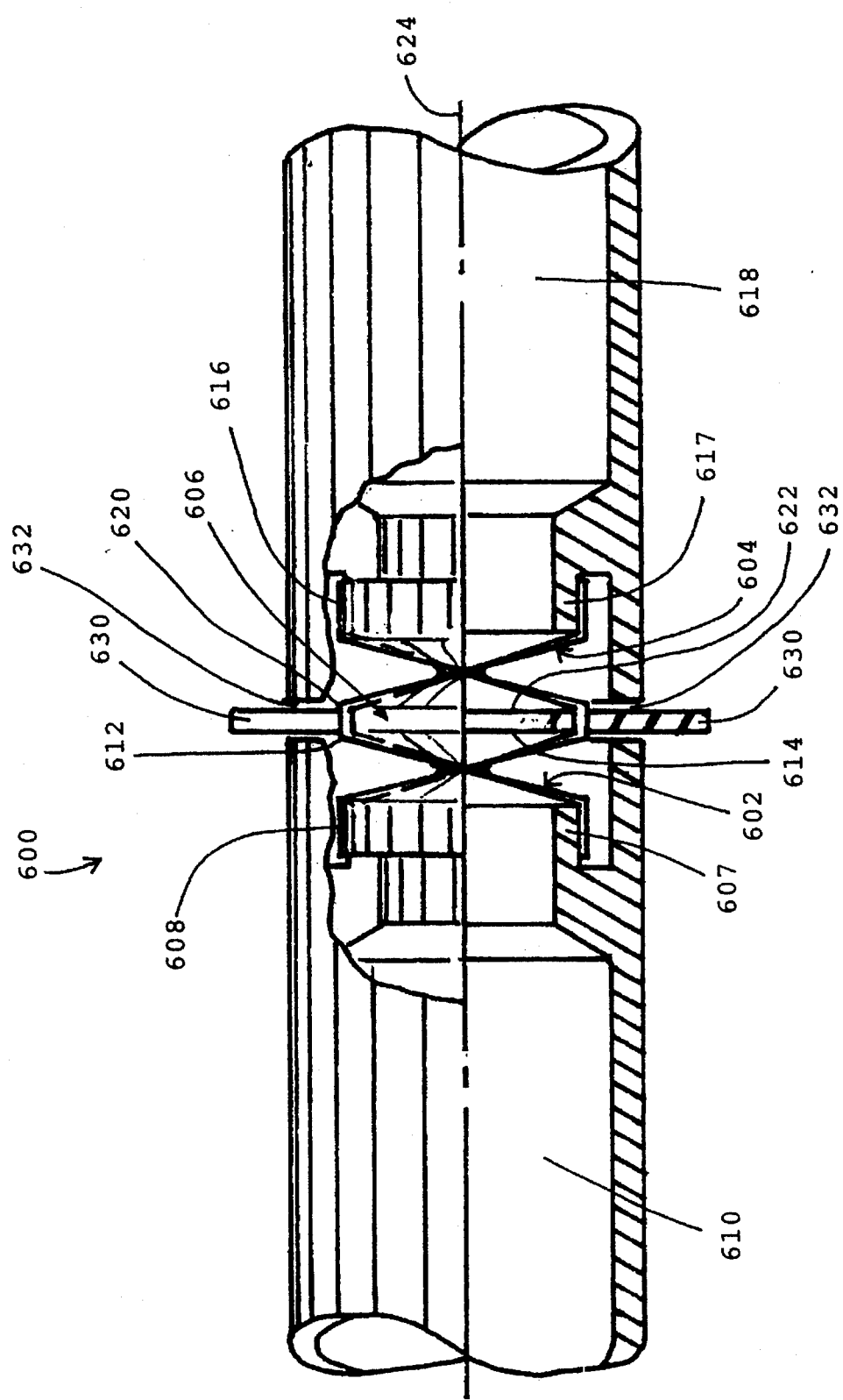
FIG. 34 shows two seals of the sort shown in FIGS. 1–16, wherein the two seals have been "ganged" together so as to reinforce one another.

Thus, counterclockwise rotation of the handles 530a and 530b by an operator of the seal assembly 500 (1) compresses springs 550 and 554, (2) stretches springs 552 and 556, (3) unwinds seal 518 so as to open a passageway therethrough, and (4) further winds seal 520 upon itself as illustratively shown in FIG. 32. Similarly, clockwise rotation of the handles 530a and 530b by an operator of the seal assembly 500 (1) compresses springs 552 and 556, (2) stretches springs 550 and 554, (3) unwinds seal 520 so as to open a passageway therethrough, and (4) further winds seal 518 upon itself as illustratively shown in FIG. 33. Furthermore, the release of the handles by the operator when the seal assembly is in either the configuration shown in FIG. 32 or FIG. 33 will allow the springs 550, 552, 554 and 556 to automatically return the seals 518 and 520 to their "neutral" closed configurations.

In addition to the foregoing, connecting element 515 optionally may include a one-way pressure relief valve 536 (FIG. 30) extending from its outer surface 532 radially inwardly to internal cavity 538. Pressure relief valve 536, in conjunction with slots 534a and 534b, thereby provides a passageway for the escape of gas from the cavity 538 as material from the container flows from the container into the internal cavity 538. In addition, pressure relief valve 538 may assist in the outflow of material from the cavity 538 in cases wherein the opening through seal 520 is small.

Figure 31:
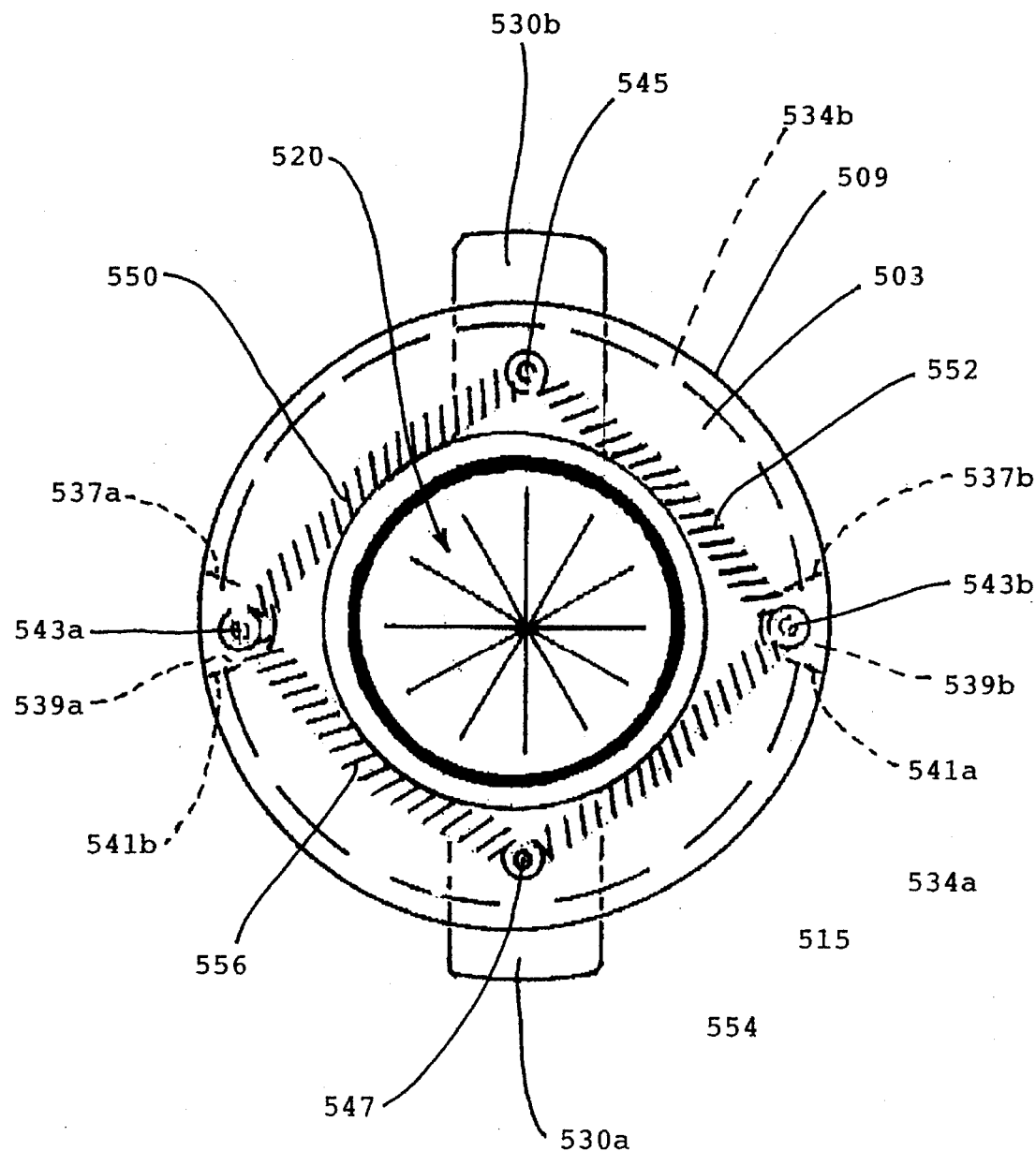
FIG. 31 is an end view taken along line 31—31 FIG. 30.

In operation, therefore, the seal assembly 500 initially resides in its "neutral" position wherein both seal 518 and seal 520 are in their respective closed configurations and the handles are located substantially centrally between the ends of their corresponding slots (see FIG. 31). Thereafter, the bottle is tipped, and the handles are rotated counterclockwise from the "neutral" position to the position shown in FIG. 32. Alternatively, the handles may be rotated prior to the tipping of the bottle. In either event, the movement of the handles rotates the connecting element counterclockwise about the axis 504 so as to open seal 518, tighten the closure of seal 520 and allow a predetermined portion of the contents of the bottle to flow into and fill the internal cavity 538 of the connecting element 515. See generally FIG. 30.

The handles are then rotated clockwise to their "neutral" position so as to close seal 518, thereby enclosing a preselected quantity of material within the cavity 538. Thereafter, when it is desired to dispense the preselected enclosed quantity of material, the handles are rotated clockwise so as to open seal 520, tighten the closure of seal 518 and allow the previously enclosed preselected quantity of material to be dispensed through open end 508a of the seal assembly 500. Finally, release of the handles will allow the springs to return the seal assembly to its "neutral" position.

It should be noted further that in the case where the housing of the seal assembly 500 is formed as a unitary structure with the container 512, loading of the container may be accomplished in the following manner. The handles are rotated clockwise so as to open seal 520 and tighten the closure of seal 518. A tubular element (not shown) is inserted through the open central portion of seal 520 into cavity 538. Thereafter, the handles are rotated counterclockwise through their "neutral" position to the position in which the seal 518 is open and the seal 520 is closed about the tubular element previously inserted therethrough. The tubular element is then inserted through open seal 518 and into the container by the exertion of an axially directed force in excess of the elastic grasping force exerted against the side walls of the tubular element by the seal 520. Once the distal end of the tubular element is in place within the container, the handles may be released so as to allow both seals 518 and 520 to elastically grasp the external walls of the tubular element. The container is thereafter filled through the tubular element, and removed from the seal assembly by either simply pulling it out of the seal assembly, or by reversing the foregoing insertion process.

Situations also may arise where the pressure difference across a single elastomeric tubular seal exceeds the capability of the seal to reliably prevent passage of material therethrough. In those situations, a "ganged" series seal assembly such as that illustratively depicted in FIG. 34 might be utilized. More specifically, the "ganged" seal assembly 600 shown in FIG. 34 includes a pair of elastomeric tube seals 602 and 604 and a tubular connecting element 606. A first end 608 of seal 602 is attached about a circular flange 607 surrounding an opening in a first environment 610 while the other end 612 of seal 602 is affixed about an opening on a first side 614 of a connecting element, such as washer-like element 606. Similarly, a first end 616 of seal 604 is attached about a circular flange 617 surrounding an opening in a second environment 618 while the other end 620 of the seal 606 is affixed about an opening in the other side 622 of the connecting element 606. The seals 602 and 604 and the connecting element 606 are co-axially aligned along axis 624, and the affixation of the ends of the seals 602 and 604 is such that seal 602 is open when seal 604 is open and vice versa. Obviously, additional seals may be ganged in series with the two seals depicted in a similar manner in the event that the application requires greater pressure holding power for the seal assembly.

The opening and closing of the latter seal assembly is facilitated by the provision of handles 630. As in the previous embodiment, the handles extend through radial slots 632 in the housing 634 which surround seals 602 and 604. Handles 630 are adapted to be grasped by a user and rotated about axis 624 so as to rotate connecting element 606 about axis 624 while environments 610 and 618 are held fixed. This rotational movement of the handles 630 in one direction will cause the elastomeric tube seals to wrap upon themselves, thereby closing the passageway between the different environments in exactly as many locations as there are elastomeric tube seals present in the "ganged" series. Similarly, rotation of the handles about the axis in the other direction will cause seals previously wrapped upon themselves to be unwrapped, thereby opening the passageway between the different environments.

Figure 35:
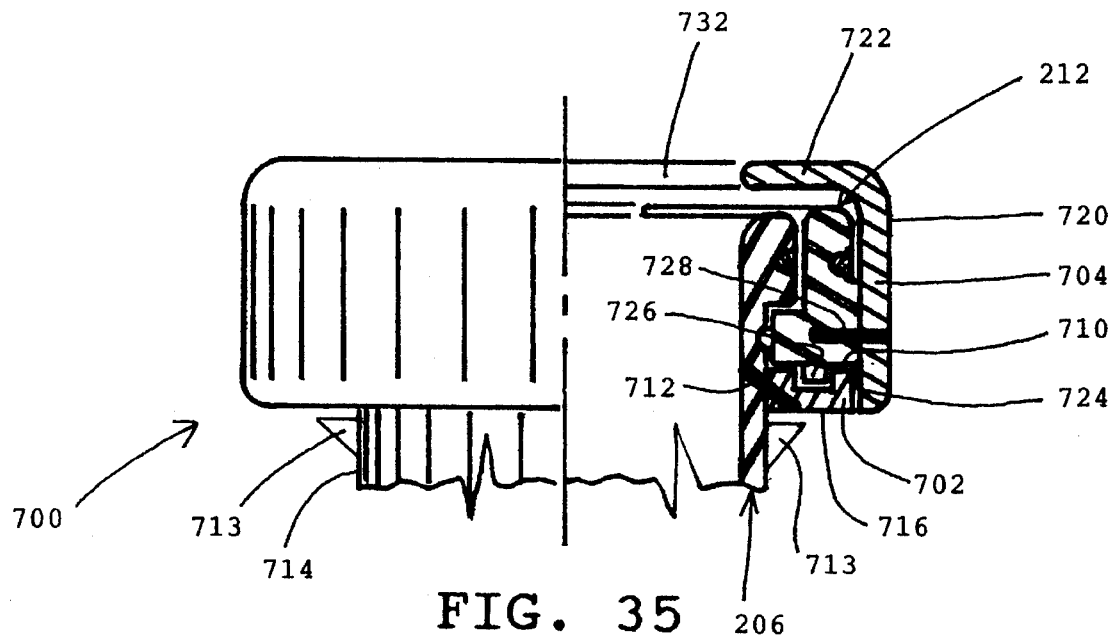
FIG. 35 is a side view showing a modified form of the seal shown in FIGS. 16–25.
Figure 36:
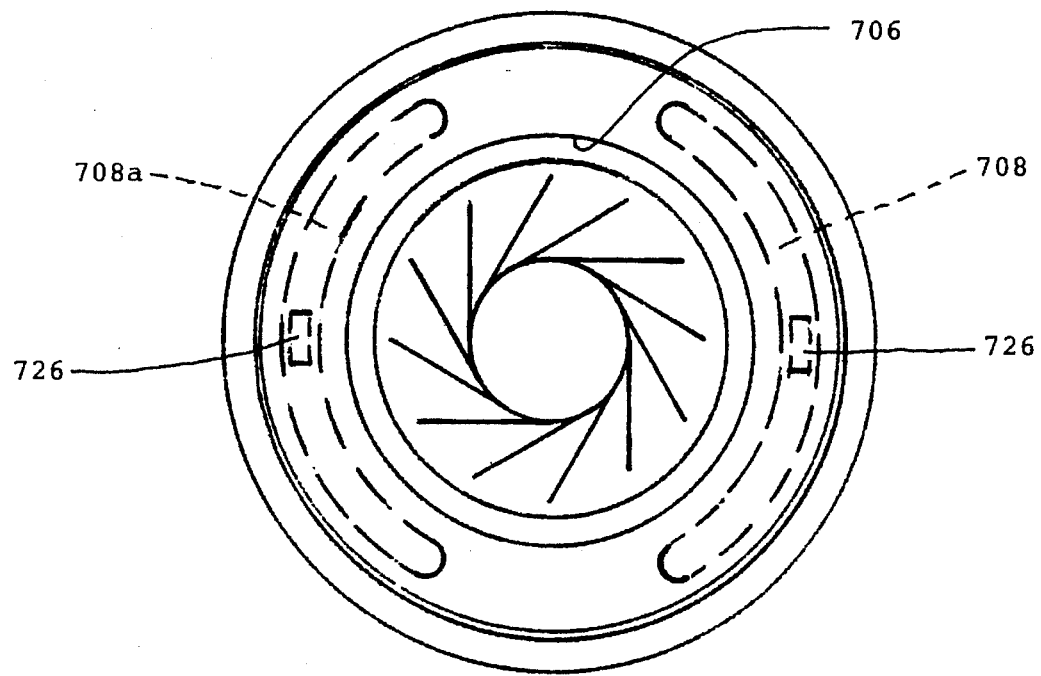
FIG. 36 is an end view of the seal shown in FIG. 35.

In yet another contemplated alternative, the seal described above with regard to FIGS. 16–25 will find utility both between closed environments and also between a closed environment and the ambient surroundings. In the latter case, however, the construction of the seal may result in problems with regard to elastomeric tube damage when the seal is fully open because loose portions of the tube folded upon itself may become snagged on other objects. Sterilization problems and tube attachment problems (i.e., problems with maintaining the attachment of the tube ends to their associated housings) also may arise. Each of these potential problems may be easily and simply solved by the provision of a protective enclosure attached in operative association with the seal. One such protective enclosure is depicted in FIGS. 35 and 36 for purposes of illustration.

The illustrative protective enclosure generally indicated at 700 includes a planar element 702 and a substantially cylindrical element 704. The planar element 702 defines a central aperture 706 therethrough and a pair of curved grooves 708, 708a in its upper surface 710. The planar element 702 surrounds and is affixed to the housing 206 below housing 212. In the embodiment shown, this affixation is accomplished by a pin 712 extending at an angle through planar element 702 adjacent aperture 706 and into housing 206. Additionally, the outer surface of housing 206 is provided with a projection 713 extending outwardly from its outer surface 714 and circumferentially about the portion of the housing 206 adjacent to the location of the seal. The lower surface 716 of the planar element 702 rides on projection 713 to assure the parallel relationship of the upper surface 710 of planar element 702 with the upper ends of housings 206 and 212.

The cylindrical element 704 includes sidewall 720 and a top wall 722. The sidewall 720 has an outer diameter substantially equal to the outer diameter of the planar member 702, and an inner diameter slightly greater than the outer diameter of housing 212 and a bottom end 724. Projections 726 extend normally from opposite portions of the bottom end 724, the projections 726 each having a vertical cross-section of a slightly smaller, but similar, shape to the vertical cross-section of curved grooves 708, 708a. The sidewall 720 is affixed to housing 212 by any convenient means such as a pin 728 extending through sidewall 720 and into housing 212. Further, the portion of the interior of sidewall 720 adjacent top wall 722 may be indented so as not to interfere with either the attachment of the elastomeric tube to housings 206 and 212 or with the relative movement of that tube with respect to those housings. The top wall 722 defines an aperture 732 centered on the axis of the seal which is slightly larger than the interior passage through housing 206.

It therefore will be understood that the planar element 702 provides raceways (i.e., grooves 708, 708a, best seen in FIG. 35) for the projections 726 when the elements of the protective enclosure are affixed about and to the seal. The operator simply grasps the exterior of the sidewall of the cylindrical member and rotates it about the axis of the housings in a first direction to rotate the housing 212 relative to the housing 206 in that direction until the projections 726 abut one end of the curved raceways. At that point, the seal will be either fully closed or fully opened. Rotation of the cylindrical member in the opposite direction until the projections abut the other end of the raceways in the planar element will move the seal to the opposite configuration to that in which it was when the projections abutted the first ends of the raceways. Obviously, the extent of rotation of the cylindrical member (and hence the outer housing relative to the inner housing) may be limited in such a manner that the seal never reaches its fully open condition. Such a limitation on the extent to which the tube may be unwound from itself will minimize the chance of seal damage arising from inadvertent snagging of loose elastomeric tube material (see, for example, FIG. 20 where the loose elastomeric tube extends away from members 206 and 212).

Still other variations, modifications, adaptations and changes will occur to those skilled in the art, and are considered to be within the scope of the present invention.

What is claimed is:

1. A variable opening seal, said seal comprising:

a housing, a rigid substantially tubular member, first and second resilient tubular elastomeric elements, and activation means for varying the configuration of said seal;

said housing having an external surface, a first longitudinal axis, an internal cavity centered on said longitudinal axis, a first end defining a first axial opening connecting said external surface to said internal cavity, a second end defining a second axial opening connecting said external surface to said internal cavity, said second axial opening being disposed in opposing relation to said first axial opening, and a radial opening connecting said internal cavity to said external surface between said first axial opening and said second axial opening;

said rigid substantially tubular member having a second longitudinal axis, a first end defining a third axial opening and a second end defining a fourth axial opening, with a first longitudinal passageway extending therebetween, said rigid substantially tubular member being co-axially located within said housing cavity between said first end of said housing and said second end of said housing such that (i) said third axial opening is disposed in opposing relation to said first axial opening and said fourth axial opening is disposed in opposing relation to said second axial opening, and (ii) said rigid substantially tubular member is restrained from axial movement within said cavity but is free to rotate about said co-incident first and second longitudinal axes;

said first resilient tubular elastomeric element having a third longitudinal axis, a first end defining a fifth axial opening and a second end defining a sixth axial opening, with a second longitudinal passageway extending therebetween;

said second resilient tubular elastomeric element having a fourth longitudinal axis, a first end defining a seventh axial opening and a second end defining an eighth axial opening, with a third longitudinal passageway extending therebetween;

said first elastomeric tubular element being affixed to said housing and to said rigid substantially tubular member so that said fifth axial opening communicates with said first axial opening and said sixth axial opening communicates with said third axial opening;

said second tubular elastomeric element being affixed to said housing and to said rigid substantially tubular member so that said seventh axial opening communicates with said fourth axial opening and said eighth axial opening communicates with said second axial opening;

said first and second resilient tubular elastomeric elements and said rigid substantially tubular member being positioned relative to one another such that when said seal is in a first position, said first and second resilient tubular elastomeric elements are twisted upon themselves in opposite directions so as to form a pair of spaced barriers between said first and second axial openings in said housing; and said activation means being attached to said rigid substantially tubular member and extending through said radial opening in said housing for rotating said rigid substantially tubular member within said housing cavity, said activation means being biased so as to urge said seal toward said first position and being rotatable relative to said housing so as to move said rigid substantially tubular member between (a) a second position wherein said second longitudinal passageway through said first resilient tubular elastomeric element is open and said second resilient tubular elastomeric element is further twisted and closed upon itself, and (b) a third position wherein said third longitudinal passageway through said second resilient tubular elastomeric element is open and said first resilient tubular elastomeric element is further twisted and closed upon itself.

2. The variable opening seal of claim 1 further comprising at least one additional rigid substantially tubular member and at least one additional resilient tubular elastomeric tubular element, wherein said rigid substantially tubular members and said resilient tubular elastomeric elements are connected in alternating series between said first axial opening and said second axial opening, said series including an axial opening of one of said resilient tubular elastomeric elements affixed in communication with said first axial opening and an axial opening of another of said resilient tubular elastomeric elements affixed in communication with said second axial opening.

3. The variable opening seal of claim 2 wherein said radial opening in said housing comprises at least one slot extending radially through and circumferentially around said housing, and said activation means comprises at least one handle, each said handle extending outwardly from a rigid substantially tubular member through one of said slots.

4. The variable opening seal of claim 1 wherein said rigid substantially tubular member defines an outer periphery, said housing cavity defines a peripheral wall, said activation means are attached at a preselected location on said outer periphery of said rigid substantially tubular member, and said rigid substantially tubular member is biased by a pair of coil springs, said coil springs respectively connecting said preselected location on said outer periphery of said rigid substantially tubular member to locations on the peripheral wall of said cavity adjacent to the radial opening through which said actuation means project, said locations on said peripheral wall of said cavity being respectively substantially 90° offset in the direction of activation means movement in said radial opening from the activation means position when said seal is in said first position.

5. A method for tranferring material between a first environment and a second environment in preselected quantities, said method comprising the steps of:

(a) providing a variable opening seal, said seal comprising:

a housing, a rigid substantially tubular member, first and second resilient tubular elastomeric elements, and activation means for varying the configuration of said seal;

said housing having an external surface, a first longitudinal axis, an internal cavity centered on said longitudinal axis, a first end defining a first axial opening connecting said external surface to said internal cavity, a second end defining a second axial opening connecting said external surface to said internal cavity, said second axial opening being disposed in opposing relation to said first axial opening, and a radial opening connecting said internal cavity to said external surface between said first axial opening and said second axial opening;

said rigid substantially tubular member having a second longitudinal axis, a first end defining a third axial opening and a second end defining a fourth axial opening, with a first longitudinal passageway extending therebetween, said rigid substantially tubular member being co-axially located within said housing cavity between said first end of said housing and said second end of said housing such that (i) said third axial opening is disposed in opposing relation to said first axial opening and said fourth axial opening is disposed in opposing relation to said second axial opening, and (ii) said rigid substantially tubular member is restrained from axial movement within said cavity but is free to rotate about said co-incident first and second longitudinal axes;

said first resilient tubular elastomeric element having a third longitudinal axis, a first end defining a fifth axial opening and a second end defining a sixth axial opening, with a second longitudinal passageway extending therebetween;

said second resilient tubular elastomeric element having a fourth longitudinal axis, a first end defining a seventh axial opening and a second end defining an eighth axial opening, with a third longitudinal passageway extending therebetween;

said first elastomeric tubular element being affixed to said housing and to said rigid substantially tubular member so that said fifth axial opening communicates with said first axial opening and said sixth axial opening communicates with said third axial opening; and said second tubular elastomeric element being affixed to said housing and to said rigid substantially tubular member so that said seventh axial opening communicates with said fourth axial opening and said eighth axial opening communicates with said second axial opening;

said first and second resilient tubular elastomeric elements and said rigid substantially tubular member being positioned relative to one another such that when said seal is in a first position, said first and second resilient tubular elastomeric elements are twisted upon themselves in opposite directions so as to form a pair of spaced barriers between said first and second axial openings in said housing; and said activation means being attached to said rigid substantially tubular member and extending through said radial opening in said housing for rotating said rigid substantially tubular member within said housing cavity, said activation means being biased so as to urge said seal toward said first position and being rotatable relative to said housing so as to move said rigid substantially tubular member between (a) a second position wherein said second longitudinal passageway through said first resilient tubular elastomeric element is open and said second resilient tubular elastomeric element is further twisted and closed upon itself, and (b) a third position wherein said third longitudinal passageway through said second resilient tubular elastomeric element is open and said first resilient tubular elastomeric element is further twisted and closed upon itself;

(b) sequentially manipulating said activation means in order so as to:

(1) place said seal in said second position and allow material from said first environment to enter said rigid substantially tubular member and the portions of said first and second resilient tubular elastomeric elements immediately adjacent thereto;

(2) place said seal in said first position thereby separating a preselected quantity of said material from said first environment from the remainder of said material; and (3) place said seal in said third position thereby allowing said preselected quantity of said material from said first environment to move toward said second environment.

6. The method of claim 5 wherein said variable seal further comprises at least one additional rigid substantially tubular member and at least one additional resilient tubular elastomeric tubular element, wherein said rigid substantially tubular members and said resilient tubular elastomeric elements are connected in alternating series between said first axial opening and said second axial opening, said series including an axial opening of one of said resilient tubular elastomeric elements affixed in communication with said first axial opening and an axial opening of another of said resilient tubular elastomeric elements affixed in communication with said second axial opening, and successively transferring said preselected quantity of material through each closed ended passageway formed by said series of rigid substantially tubular members and said resilient tubular elastomeric elements between said first longitudinal end of said housing and said second longitudinal end of said housing.

\* \* \* \* \*